US012676802B2

(12) United States Patent
Jain et al.

(10) Patent No.:  US 12,676,802 B2
(45) Date of Patent:  Jul. 7, 2026

(54) METHOD AND SYSTEM FOR VALIDATING EXPECTATIONS ON A PROXY SERVER BASED ON A SET OF SPECIFICATIONS

(71) Applicant: AGILE FAQS TECHNOLOGY PVT LTD, Goregaon East (IN)

(72) Inventors: Naresh Bhawarlal Jain, Goregaon West Mumbai (IN); Hari Krishnan P, Malleswaram West (IN); Joel Cossy Rosario, Andheri West (IN); Milee Jain, Goregaon West Mumbai (IN)

(73) Assignee: AGILE FAQS TECHNOLOGY PVT LTD., Mumbai (IN)

( * ) Notice: Subject to any disclaimer, the term of this patent is extended or adjusted under 35 U.S.C. 154(b) by 58 days.

(21) Appl. No.: 18/678,410

(22) Filed: May 30, 2024

(65) Prior Publication Data
US 2024/0406079 A1  Dec. 5, 2024

(30) Foreign Application Priority Data
Jun. 2, 2023  (IN) ............................. 202321038098

(51) Int. Cl.
H04L 41/5054  (2022.01)
H04L 41/5009  (2022.01)

(52) U.S. Cl.
CPC ...... H04L 41/5054 (2013.01); H04L 41/5009 (2013.01)

(58) Field of Classification Search
CPC .................................................. H04L 41/5054
See application file for complete search history.

(56) References Cited

U.S. PATENT DOCUMENTS 11,372,840 B2 *  6/2022  Johry .................. G06F 11/3698

* cited by examiner

*Primary Examiner* — Esther B. Henderson
(74) *Attorney, Agent, or Firm* — Nixon & Vanderhye, PC

(57) ABSTRACT

A system and method for validating expectations based on a set of specifications is provided. The invention comprises receiving, a set of specifications, a set of expectations, and a set of requests. Further a set of scenarios are generated based on the set of specifications. The set of expectations are compared with the set of scenarios. A set of valid and invalid expectations from the set of expectations are identified based on the comparison and stored. The received requests are services based on the set of scenarios and the set of valid expectations. While servicing, the set of specifications are monitored to identify any changes and the set of scenarios are dynamically updated. The set of expectations are compared again with the updated scenarios, to identify updated set of valid expectations. Further set of new requests are serviced based on updated set of valid expectations and updated scenarios.

31 Claims, 11 Drawing Sheets

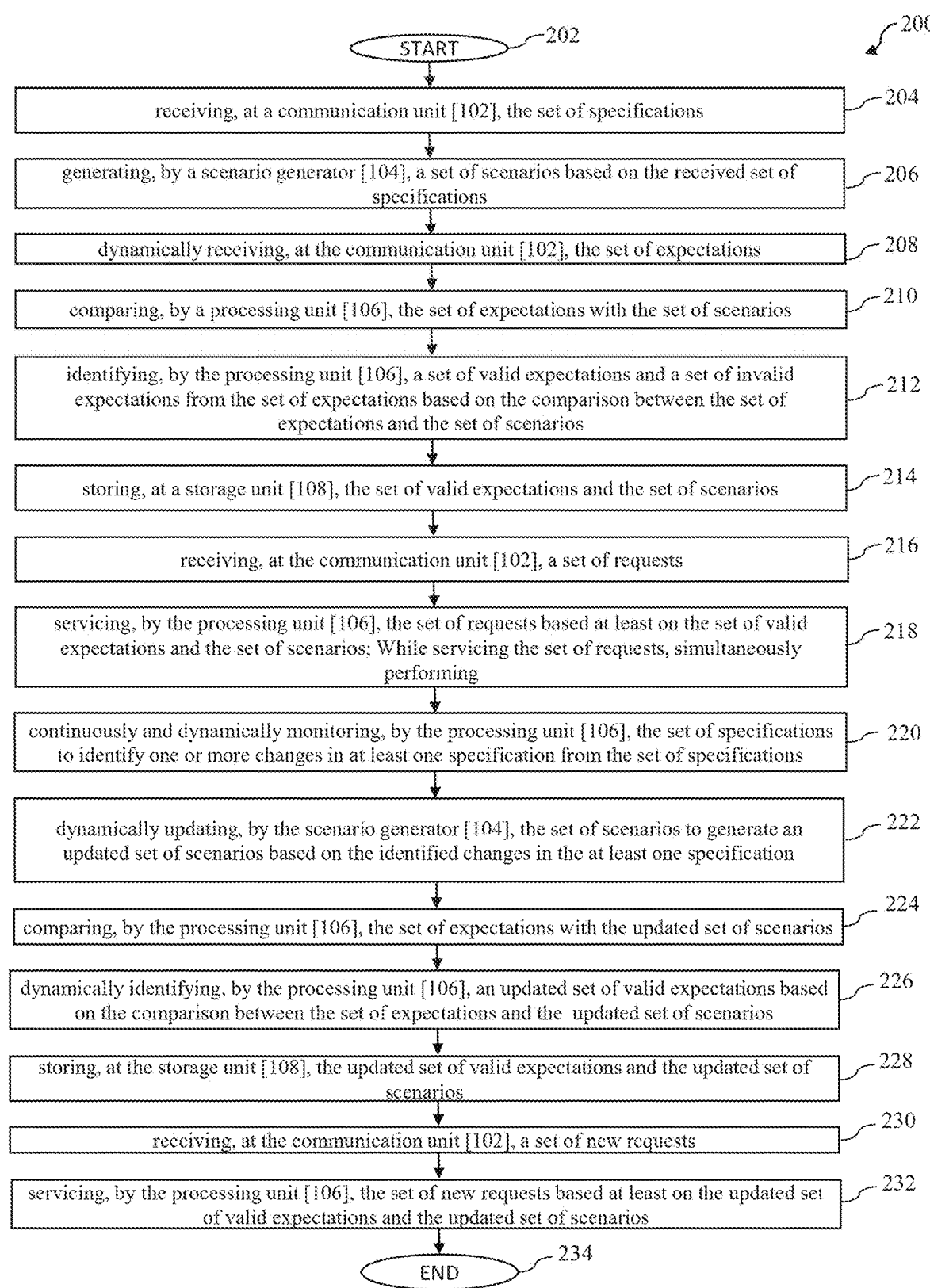

START — 202

— 200 receiving, at a communication unit [102], the set of specifications — 204 generating, by a scenario generator [104], a set of scenarios based on the received set of specifications — 206 dynamically receiving, at the communication unit [102], the set of expectations — 208 comparing, by a processing unit [106], the set of expectations with the set of scenarios — 210 identifying, by the processing unit [106], a set of valid expectations and a set of invalid expectations from the set of expectations based on the comparison between the set of expectations and the set of scenarios — 212 storing, at a storage unit [108], the set of valid expectations and the set of scenarios — 214 receiving, at the communication unit [102], a set of requests — 216 servicing, by the processing unit [106], the set of requests based at least on the set of valid expectations and the set of scenarios; While servicing the set of requests, simultaneously performing — 218 continuously and dynamically monitoring, by the processing unit [106], the set of specifications to identify one or more changes in at least one specification from the set of specifications — 220 dynamically updating, by the scenario generator [104], the set of scenarios to generate an updated set of scenarios based on the identified changes in the at least one specification — 222 comparing, by the processing unit [106], the set of expectations with the updated set of scenarios — 224 dynamically identifying, by the processing unit [106], an updated set of valid expectations based on the comparison between the set of expectations and the updated set of scenarios — 226 storing, at the storage unit [108], the updated set of valid expectations and the updated set of scenarios — 228 receiving, at the communication unit [102], a set of new requests — 230 servicing, by the processing unit [106], the set of new requests based at least on the updated set of valid expectations and the updated set of scenarios — 232

END — 234

FIGURE 2

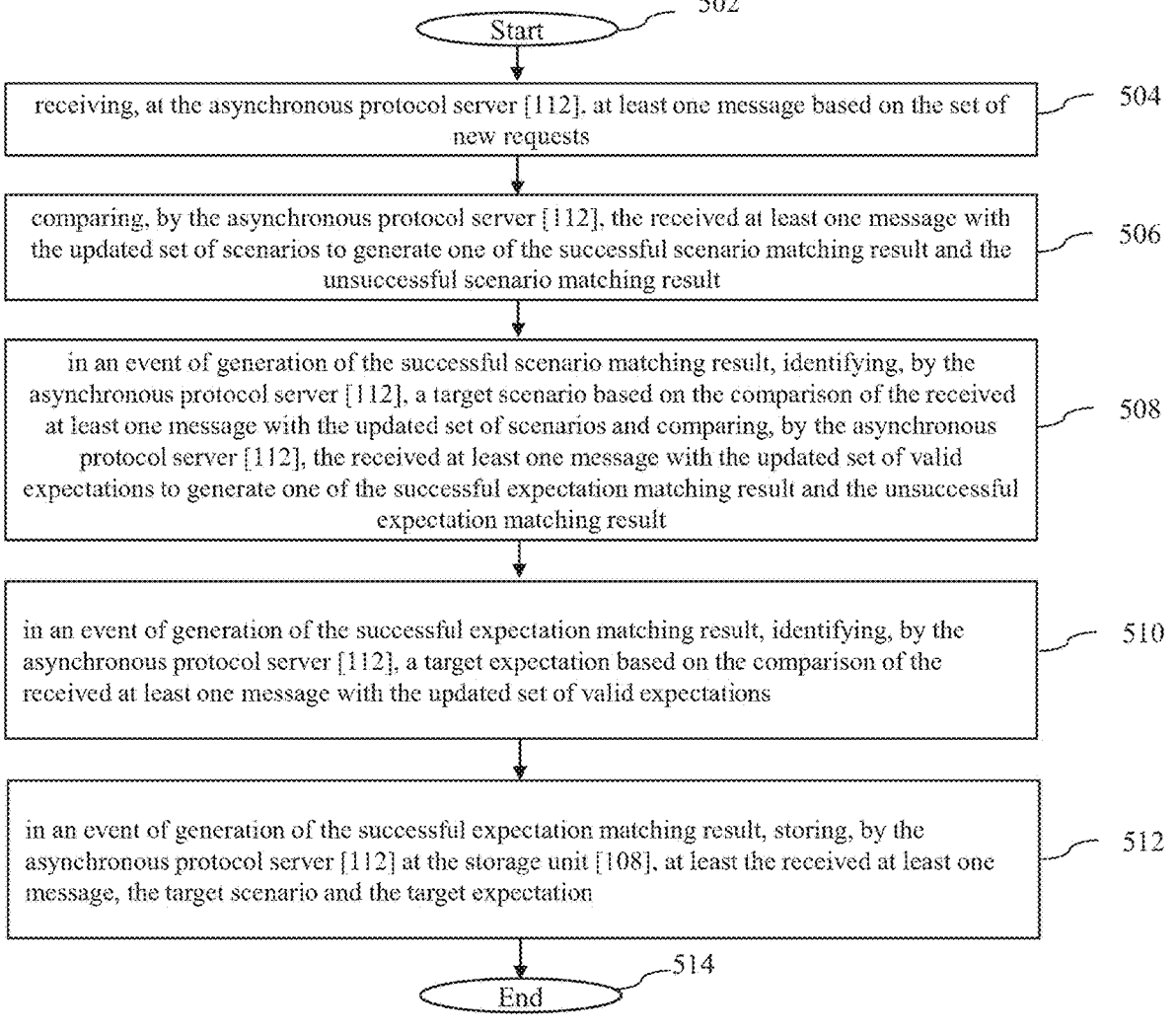

502

Start

504 receiving, at the asynchronous protocol server [112], at least one message based on the set of new requests

506 comparing, by the asynchronous protocol server [112], the received at least one message with the updated set of scenarios to generate one of the successful scenario matching result and the unsuccessful scenario matching result

508 in an event of generation of the successful scenario matching result, identifying, by the asynchronous protocol server [112], a target scenario based on the comparison of the received at least one message with the updated set of scenarios and comparing, by the asynchronous protocol server [112], the received at least one message with the updated set of valid expectations to generate one of the successful expectation matching result and the unsuccessful expectation matching result

510 in an event of generation of the successful expectation matching result, identifying, by the asynchronous protocol server [112], a target expectation based on the comparison of the received at least one message with the updated set of valid expectations

512 in an event of generation of the successful expectation matching result, storing, by the asynchronous protocol server [112] at the storage unit [108], at least the received at least one message, the target scenario and the target expectation

514

End

FIGURE 5

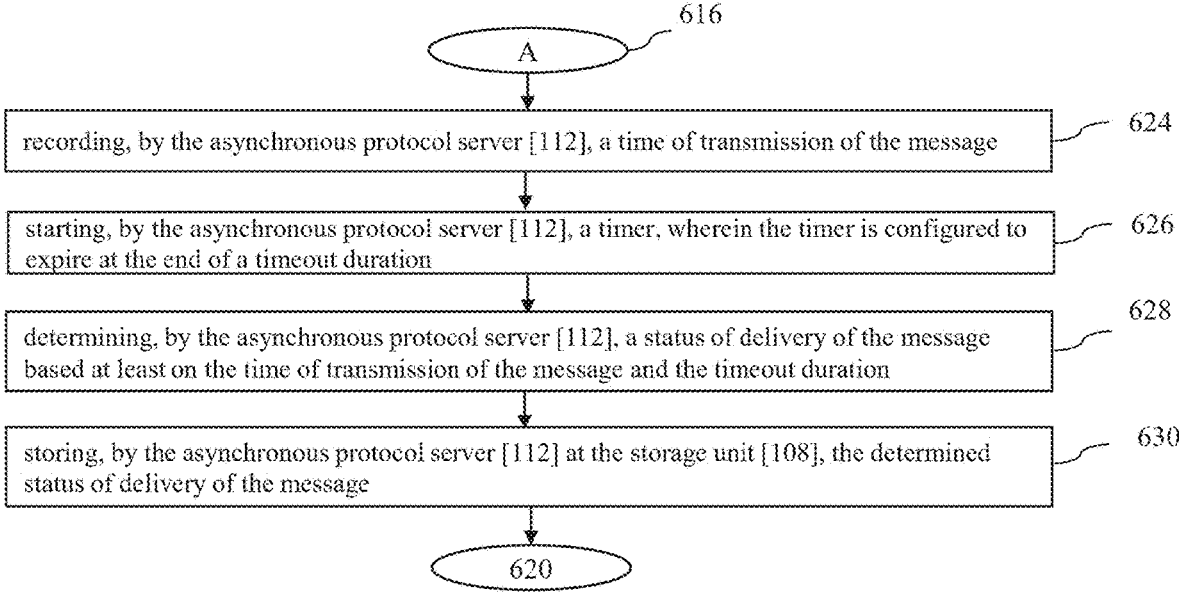

616

A recording, by the asynchronous protocol server [112], a time of transmission of the message　　624 starting, by the asynchronous protocol server [112], a timer, wherein the timer is configured to expire at the end of a timeout duration　　626 determining, by the asynchronous protocol server [112], a status of delivery of the message based at least on the time of transmission of the message and the timeout duration　　628 storing, by the asynchronous protocol server [112] at the storage unit [108], the determined status of delivery of the message　　630

| Proxy Server Coverage Report | | | |
|---|---|---|---|
| API Specification File Name | No of Data Elements | Missed Data Elements | Coverage % |
| product.yaml (OpenAPI 3.0.3) | 19 | 6 | 72 |
| order-dispatch.yaml (AsyncAPI 2.0.0) | 6 | 3 | 50 |
| Total | 25 | 9 | 64 |

FIGURE 8A

| API Coverage Drill Down – product.yaml (OpenAPI 3.0.3) | | | | | | | | |
|---|---|---|---|---|---|---|---|---|
| Data Element Coverage: /products POST | | | | | | | | |
| Parameter Name | Parameter Type | Parameter Data Type | Leaf level elements | Leaf level element | Required | Nullable | Possible values | Covered |
| Request Components | | | | | | | | |
| trace-id | request-header | string (format: guid) | N/A | N/A | no | no | string | Yes |
| product | request-body | object | product.name | string | yes | no | string | Yes |
| | | | product.price | number | yes | no | number | Yes |
| | | | product.category | enum ("electronics","apparel") | yes | no | electronics | Yes |
| | | | | | | | apparel | No |
| | | | product.dimensions.lengthInInches | number | yes | no | number | Yes |
| | | | product.dimensions.breadthInInches | number | yes | no | number | Yes |
| | | | product.dimensions.heightInInches | number | yes | no | number | Yes |
| | | | product.weightInOunces | number | yes | no | number | Yes |
| | | | product.imageUrl | string | no | yes | string | Yes |
| | | | | | | | null | No |
| | | | product.isDraft | boolean | yes | no | true | No |
| | | | | | | | false | Yes |
| Response Components | | | | | | | | |
| 200 OKAY Response | | | | | | | | |
| product-create-success | response-body | object | success.productId | string | yes | no | string | Yes |
| | | | success.code | number | yes | no | number | Yes |
| trace-id | response-header | string | N/A | N/A | yes | no | string | Yes |
| 4xx Responses | | | | | | | | |
| product-create-error | response-body (4xx) | object | error.message | string | yes | no | string | No |
| | | | error.code | number | yes | no | number | No |
| trace-id | response-header | string | N/A | N/A | yes | no | string | No |
| | | | | | | | Total Coverage | 72 |

FIGURE 8B

| API Coverage Drill Down - order-dispatch.yaml (Async API 2.x.x) | | | | | | | | |
|---|---|---|---|---|---|---|---|---|
| Data Element Coverage: ordersDispatch publish | | | | | | | | |
| Component Type | Component Name | Type | Leaf level elements | Leaf level element datatypes | Required | Nullable | Possible Values | Covered |
| Header | traceId | string | N/A | N/A | yes | no | string | Yes |
| Payload | orderDispatch | object | order-id | string | yes | no | string | Yes |
|  |  |  | priority | enum ("Express", "Standard") | yes | no | "Express" | Yes |
|  |  |  |  |  | yes | no | "Standard" | No |
|  |  |  |  |  |  |  | Total Coverage % | 75 |

FIGURE 8C

METHOD AND SYSTEM FOR VALIDATING EXPECTATIONS ON A PROXY SERVER BASED ON A SET OF SPECIFICATIONS

This application claims priority to IN patent application No. 202321038098 filed Jun. 2, 2023, the entire contents of which are hereby incorporated by reference.

TECHNICAL FIELD

The present invention relates generally to the field of validating a set of expectations that are being set on a proxy server based on a set of specifications and more particularly to systems and methods for validating the set of expectations by a synchronous protocol server and an asynchronous protocol server.

BACKGROUND OF THE DISCLOSURE

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Nowadays, developers use emulators to isolate applications they are building from their dependencies during phases of software development such as development and testing. In order to emulate the dependencies of their application they leverage tools and techniques such as service virtualization that can replicate the systems behavior in general and its responses in particular. Service virtualization as a broader concept is implemented with the help of proxy servers operating in a mock or stub implementation. Based on a specification, which describes the features, procedures, and functions of an application, a mocking service/server may produce a mock implementation for that specification. The mock server is configured to return specific responses for different requests based on the specification. In a stub implementation, the proxy server may emulate the behavior of an existing code or yet to be developed code to provide canned responses.

In HTTP request-response systems or asynchronous systems, a proxy server typically requires a certain setup, popularly known as response mapping or expectation setting. The existing proxy servers parse a specification to simulate the behaviour of an application. If a specification is updated but the corresponding request-response mapping or expectations are not updated/revalidated, it is possible that the expectations are not in line with the updated specification. Such a situation results in a "stale stub" problem. There is a need in the existing solutions to leverage, say a proxy server, to update response mapping based on the changes in the specification and dynamically update/revalidate the expectations. Further, the existing solutions do not have the ability to set and validate expectations dynamically, so the expectation is usually out of sync with the updated specification which can lead to applications that are being built/developed with these existing solutions that emulate a service to also go out of sync leading to major integration issues which may be very late in the application development lifecycle thereby involving significant cost and effort to fix such issues. Therefore, there is a need to acknowledge and address this problem in a timely manner to identify the mismatch at an early stage or at any time during the software development lifecycle.

Furthermore, the existing solutions have proxy implementation restricted to a single type of specification and/or specific programming languages and technology stacks; for instance, some of the existing solutions are specific to the OpenAPI specification. This limits the existing solutions' ability to incorporate other varied specifications and leads to a complex and fragmented development experience. Therefore, it is a requirement in the state of the art to develop a language-agnostic and specification standard agnostic platform for holistic analysis.

Therefore, there are a number of limitations of the current existing solutions and there is a need in the art to provide for validating a set of expectations based on a specification.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a solution for validating a set of expectations based on a specification.

In order to achieve the aforementioned objectives, one aspect of the invention relates to a method for validating a set of expectations based on a set of specifications. Said method comprises receiving, at a communication unit, the set of specification and generating, by a scenario generator, a set of scenarios based on the received set of specifications. Further, the method comprises dynamically receiving, at the communication unit, the set of expectations. The method further encompasses comparing, by a processing unit, the set of expectations, with the set of scenarios and identifying, by the processing unit, a set of valid expectations and a set of invalid expectations from the set of expectations based on the comparison between the set of expectations and the set of scenarios and storing, at a storage unit, the set of valid expectations and the set of scenarios. Further, the method comprises receiving at the communication unit, a set of requests. The method further comprises servicing by the processing unit, the set of requests based at least on the set of valid expectations and the set of scenarios, while servicing the set of requests, simultaneously performing: continuously and dynamically monitoring, by the processing unit the set of specifications to identify one or more changes in the at least one specification from the set of specifications. The method further comprises dynamically updating, by the scenario generator, the set of scenarios to generate an updated set of scenarios based on the identified changes in the at least one specification. The said method further encompasses comparing, by the processing unit, the set of expectations with the updated set of scenarios. Further, the method comprises dynamically identifying, by the processing unit, an updated set of valid expectations and an updated set of valid expectations based on the comparison between the set of expectations and the updated set of scenarios. Thereafter, the method comprises storing, at the storage unit, the updated set of valid expectations and the updated set of scenarios. Further, the method incorporates receiving, at the communication unit, a set of new requests and servicing by the processing unit, the set of new requests based at least on the updated set of valid expectations and the updated set of scenarios.

Another aspect of the present disclosure relates to a system to validate a set of expectations based on a set of specifications. Said system comprises a communication unit configured to receive the set of specifications, and dynamically receive the set of expectations. The said communication unit is configured to receive a set of requests and receive a set of new requests. Further, the system comprises a scenario generator, configured to generate a set of scenarios based on the received set of specifications. Further, a processing unit is configured to compare the set of expectations with the set of scenarios and identify a set of valid expectations and a set of invalid expectations from the set of expectations based on the comparison between the set of expectations and the set of scenarios. Thereafter, the system further encompasses a storage unit configured to store the valid expectations and the set of scenarios. Further, the processing unit is configured to service, the set of requests based at least on the set of valid expectations and the set of scenarios, service the set of requests, simultaneously perform continuously and dynamically monitor the set of specifications to identify one or more changes in the at least one specification from the set of specifications. The said scenario generator is further configured to dynamically update the set of scenarios based on the identified changes in the at least one specification. Said processing unit is further configured to compare the set of expectations with the set of updated scenarios and dynamically identify, an updated set of valid expectations based on the comparison between the set of expectations and the updated set of scenarios. Thereafter, the storage unit is further configured to store the updated set of valid expectations and the updated set of scenarios. Next, the processing unit is configured to service the set of new requests based at least on the updated set of valid expectations and the updated set of scenarios.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 2 illustrates an exemplary method flow diagram, for validating a set of expectations based on at least one specification, in accordance with the exemplary embodiments of the present invention.

FIG. 5 illustrates a method of servicing requests pertaining to asynchronous protocol implemented by an asynchronous protocol server emulating a message receiver, in accordance with the exemplary embodiments of the present invention.

FIGS. 6A and 6B illustrates a method of servicing requests pertaining to asynchronous protocol implemented by an asynchronous protocol server emulating a message sender, in accordance with the exemplary embodiments of the present invention.

FIGS. 8A, 8B and 8C illustrates an exemplary API coverage report, in accordance with the exemplary embodiments of the present invention.

Figure 1:
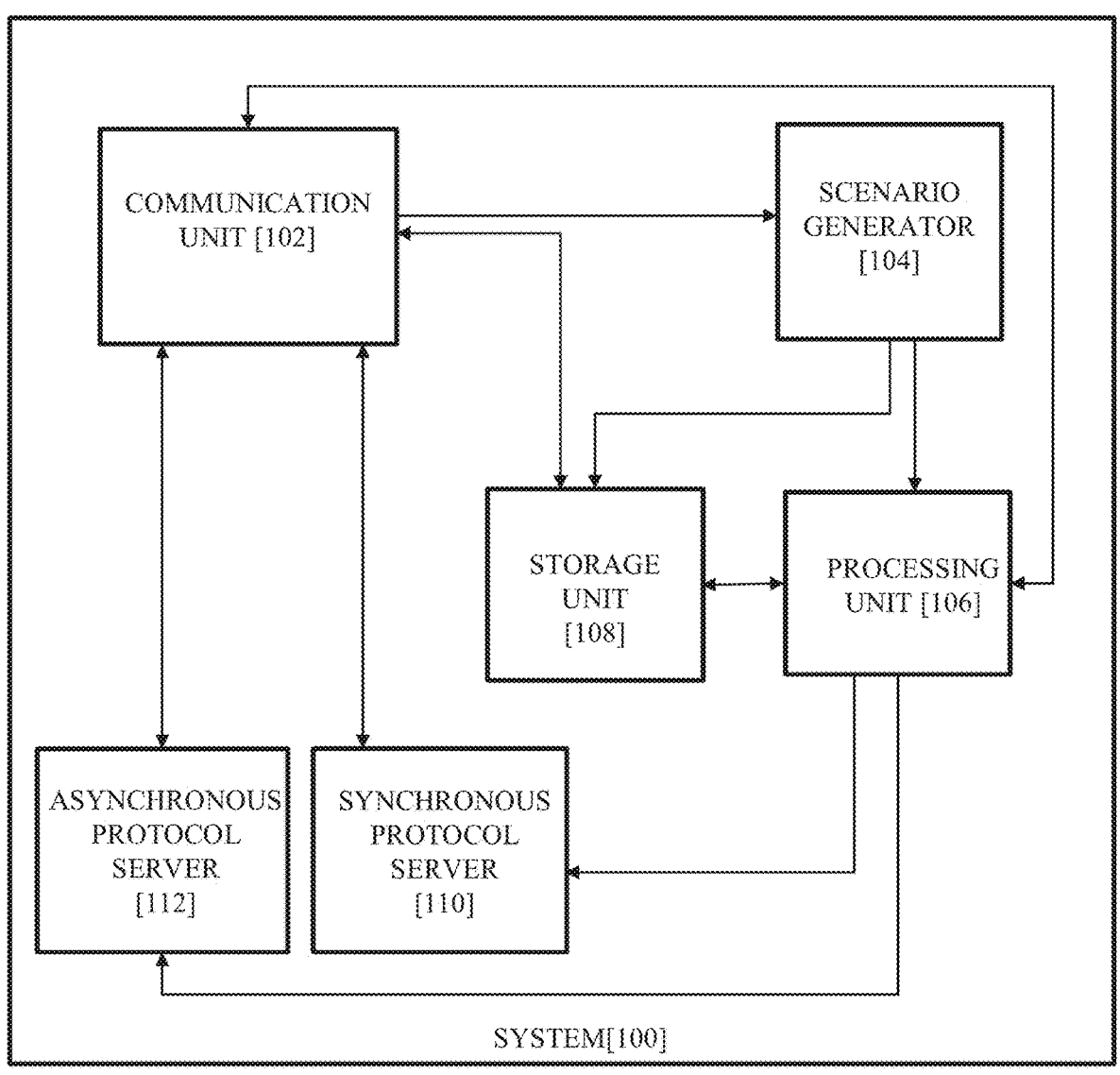
FIG. 1 illustrates an exemplary block diagram of a system for validating a set of expectations based on at least one specification, in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, processes, and other components may be shown as components in block diagram form in order not to obscure the embodiments in unnecessary detail.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, a "processing unit" or "processor" or "operating processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "a user equipment", "a user device", "a smart-user-device", "a smart-device", "an electronic device", "a mobile device", "a handheld device", "a wireless communication device", "a mobile communication device", "a communication device" may be any electrical, electronic and/or computing device or equipment, capable of implementing the features of the present disclosure. The user equipment/device may include, but is not limited to, a mobile phone, smart phone, laptop, a general-purpose computer, desktop, personal digital assistant, tablet computer, wearable device or any other computing device which is capable of implementing the features of the present disclosure. Also, the user device may contain at least one input means configured to receive an input from at least one of a transceiver unit, a processing unit, a storage unit, a detection unit and any other such unit(s) which are required to implement the features of the present disclosure.

As used herein, "storage unit" or "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The storage unit stores at least the data that may be required by one or more units of the system to perform their respective functions.

As disclosed in the background section, existing technologies and solutions for validating a set of expectations based on a specification have many limitations and in order to overcome at least some of the limitations of the prior known solutions, the present disclosure provides a solution for validating a set of expectations in real-time, as it continuously monitors changes in the specification and, dynamically updates the expectations based on said changes, with the use of a smart proxy server. The present invention validates the set of expectations dynamically and is able to identify any mismatch between the set of expectations and the specification, at the earliest. The present invention encompasses validating expectations for both synchronous and asynchronous protocols. The details of the solution are described in further detail herein with reference to the drawings.

The present invention provides a technical advancement over the currently known solutions by providing the capability of validating a set of expectations by continuously monitoring any changes in the at least specification and accordingly updating the set of expectations. Thereby, the present solution is able to address the stale-stub problem which is quite common in the existing proxy servers. Also, the present solution provides a technical advancement over the currently known solutions by not restricting to any particular specification, say an OpenAPI specification, and providing a platform that is agnostic to technology stack and programming language. Further, the present invention provides a solution whereby a proxy server is able to service requests and simultaneously update the set of valid expectations, without any down-time, i.e., the proxy server need not be shut down to be able to update the set of valid expectations based on changes in the specification.

As used herein, a 'set' may include one or more items. Further the set may also be a null set.

As used herein, a 'expectations' may include a request response mapping, a mapping of message to receive and actions to perform, a mapping of message to send and the aspects to verify successful delivery, etc.

Each expectation pertaining to a synchronous protocol includes at least one 'request' mapped to one 'responses'. Further, expectations pertaining to a synchronous protocol may include certain additional information apart from the 'request' and the 'response' components. Consider the following examples for the sake of understanding:

```
Request / Response Expectation - Http
{
    "http-request": {
        "path": "/products/1",
        "method": "GET"
    },
    "http-response": {
        "status": 200,
        "body": {
            "name": "Mobile phone holder",
            "price": 10,
            "category": "electronics accessories",
            "imageUrl": "https://images.example.com/products/1.jpeg"
        },
        "status-text": "OK"
    }
    "delay-in-seconds": 3
}
```

Here, the request includes 'GET/products/1' and the response mapping returns the product details for product Id 1, wherein the product details include the name, price, category and image of the product. Further, in this expectation, the additional information is: "delay-in-seconds": 3. This represents that when a request: 'GET/products/1' is received, then the system is required to send a response: the name, price, category and image of the product for product id1; and the system is expected to send this response after a delay of 3 seconds, i.e., the response is to be sent by the system 3 seconds after the request has been received.

Another example of an expectation in an asynchronous scenario, for instance when proxy server is emulating message receiver, is as follows:

```
{
    "jms-message-to-receive": {
        "channel": "orders",
        "payload": {
```

-continued

```
        "items": [{"sku1", 3}, {"sku2", 1}],
        "deliveryMode": "priority",
        "trackingNumber": "123"
      }
    },
    "jms-message-on-receive-actions": {
      "acknowledge": true,
      "dequeue": true,
    }
  }
}
```

Here, the "jms-message-to-receive" includes the channel details where the system can expect a message and the payload to be expected; and "jms-message-on-receive-actions" include the actions that the proxy server/system needs to emulate on receiving such a message. For instance, as per the above expectation, a message may be received on the channel: orders, wherein the message mentions the item name, delivery mode and tracking number. The expectation set here is that when such a message is received, then the action to be taken is to acknowledge the receipt of the message and dequeue the message.

Yet another example of an expectation in the asynchronous scenario when Proxy Server is emulating message sender, is as follows:

```
{
  "jms-message-to-send": {
    "channel": "deliveryNotifications",
    "payload": {
      "orderId": "123123",
      "status": "In Transit"
    }
  },
  "jms-message-on-send-actions": {
    "timeoutInSeconds": 360,
    "retry": 3
  }
}
```

Here, the "jms-message-to-send" includes the channel details and the payload that proxy server/system needs to send and the "jms-message-on-send-actions" includes timeout and retry details. For instance, as per the above expectation, a message may be sent on the channel: deliveryNotifications, wherein the message mentions the order id and status. The expectation set here is that when a trigger is received such a message is to be sent by the system/proxyserver, then the action to be taken is to check for delivery notification for 360 seconds and if the notification is not received in this time period, the system must retry to send the message. This whole process is to be repeated until the delivery notification is received within 360 seconds or the number of attempts have reached 3.

Yet another example of an expectation in a long lasting connection which may involve an initial request to the Proxy Server to which the Proxy server may send several responses over a period of time until the connection is terminated.

Long lasting connection—Server Sent Events—Expectation for Initial Response:

```
{
  "request": {
    "path": "/order-dispatch-progress/12",
    "method": "GET"
  },
```

-continued

```
  "initial-response": {
    "payload": {
      "status": "Dispatched",
      "timeOfLastKnownStatus": "11:00:00 AM 1 January 20xx"
    },
  }
}
```

Long lasting connection—Server Sent Events—Expectations for subsequent Responses:

```
{
  "request": {
    "path": "/order-dispatch-progress/12",
    "method": "GET"
  },
  "subsequent-response": {
    "payload": {
      "status": "In-Transit",
      "timeOfLastKnownStatus": "09:00:00 AM 2 January 20xx"
    },
  }
}
{
  "request": {
    "path": "/order-dispatch-progress/12",
    "method": "GET"
  },
  "subsequent-response": {
    "payload": {
      "status": "Delivered",
      "timeOfLastKnownStatus": "18:00:00 AM 2 January 20xx"
    },
  }
}
```

Long lasting connection—server sent events—Expectation for closing connection:

```
{
  "request": {
    "path": "/order-dispatch-progress/12",
    "method": "GET"
  },
  "close-connection": {
    "payload": {
    },
  }
}
```

Here the response can be one of an initial response, a subsequent response and a connection closing response. Each response is set up through the same expectation creation process and an individual expectation id is generated for each response. The request remains the same, only the payload/response varies. Since each expectation in the server sent event example above has the same request, all these expectations are mapped to the respective long lasting connection. When a proxy-server receives the request for the first time, it responds with the "initial-response" payload and begins a long lasting connection with the client. Subsequent responses and the connection closing responses are initiated by sending a trigger with the corresponding expectation id.

All expectations are set up on the system/proxy server by sending them via http POST method to the proxy server, however, the disclosure is not limited thereto The expectations may be provided to the system/proxy server via any other method as known to a person skilled in the art.

POST://proxy-server/expectations/

And in response the proxy server returns an expectation identifier (expectationId) for each request when the expectation successfully matches the specifications that have been currently configured and thereby stored in the storage unit.

This expectationId can be used for several purposes where an expectation is required to be referred to. Examples:

1. When proxy-server/system is emulating a synchronous dependency to handle requests such as Http request/response—ExpecationId can be used to check if the corresponding expectation was exercised
2. When the proxy server is emulating a message receiver (asynchronous dependency)—ExpectationId can be used to check if a message matching the expectationId was received
3. When the proxy server is emulating a message sender (asynchronous dependency)—ExpectationId can be used to trigger/initiate the sending of a message defined in an expectation
4. When proxy-server/system is emulating a long lived connection dependency (such as a Server Sent Events), the ExpectationId can be used to trigger/initiate subsequent push responses after the initial response.

Hereinafter, exemplary embodiments of the present disclosure will be described in detail with reference to the accompanying drawings so that those skilled in the art can easily carry out the present disclosure.

Referring to FIG. 1, an exemplary block diagram of a system [100] for validating a set of expectations based on a specification. The system [100] comprises at least one communication unit [102], at least one scenario generator [104], at least one processing unit [106], at least one storage unit [108], at least one synchronous protocol server [110], and at least one asynchronous protocol server [112]. Also, all of the units of the system [100] are assumed to be connected to each other unless otherwise indicated below. Also, in FIG. 1 only a few units are shown, however, the system [100] may comprise multiple such units or the system [100] may comprise any such numbers of said units, as required to implement the features of the present disclosure.

The system [100] is configured to validate a set of expectations based on a set of specifications, with the help of the interconnection between the units of the system [100]. In an implementation, the system [100] may act as a proxy server; while in another implementation, the system [100] may be an independent system that interacts with a proxy server, in order to realize the implementation of the present invention.

More specifically, in order to implement the features of the present disclosure, the communication unit [102] is configured to receive the set of specifications, where the each specification in the set of specifications may be one of OpenAPI, AsyncAPI, Swagger, API Blueprint, RAML, but the disclosure is not limited thereto. In an implementation, the set of specifications are received from a user via a device.

The communication unit [102] is further configured to dynamically receive the set of expectations, wherein the set of expectations may be configured when the proxy server is started or while the proxy server is already running. The set of expectations may be received from a user via a device. In one implementation, the system [100] may store the set of expectations as a static file along with the set of specifications. In this implementation, the system [100] may store the set of expectations in files which are organised as folders that are configured/passed as an argument to the system [100] at startup time. Since they are configured/passed as argument at the startup time, these set of expectations are available immediately on startup. In another implementation, the set of expectations may be dynamic, where the response mapping is not done ahead of time and may be created dynamically while the proxy server is running. The set of expectations are provided by a user via a device wherein, the user communicates with the system [100] to determine what the expectation should be and what to return. This is referred to as response mapping or expectation setting. In this implementation, dynamic expectations may be set up by sending the expectation JSON over a HTTP request to an already running instance of the system [100]. Dynamic expectation setting allows users to create the expectation json on the fly based on previous operation output etc.

In yet another implementation, the system [100] may be configured to retrieve one or more expectations from a static file and also receive one or more expectations dynamically based on a user input via a device. Thus, the system [100] is configured to handle and process both static and dynamic expectations.

Further, the system [100] comprises a scenario generator [104] connected at least to the communication unit [102] and the storage unit [108]. The scenario generator [104] is configured to receive the set of specifications from the communication unit [102] and generate a set of scenarios based on the received set of specifications. The set of scenarios may include one or more scenario. In an implementation, each scenario in the set of scenarios is assigned a version number by the scenario generator [104]. For example, every scenario when it is first generated may be assigned a version number V.0. So, scenario S1 may be stored as S1-V.0 and scenario S2 is stored as S2-V.0. Further, in an event the set of specifications include a plurality of specifications, the set of scenarios also comprises a subset of scenarios for each specification from the plurality of specifications. For instance, if the set of specifications include Open API V 3.0.3 and RAML 1.0, the set of scenarios includes a first subset of scenarios for the Open API V 3.0.3 and a second subset of scenarios for the RAML 1.0.

Each scenario includes at least a cause and at least an effect, wherein the cause is a possible action and the effect is in the form of a response or action/behavior. For instance, a cause may be a HTTP request in the form of (Method (like GET, POST, PUT), URL/path, headers, request body), but the disclosure is not limited thereto; and the effect may be an HTTP response as (Content-type, Headers, Response-body) but the disclosure is not limited thereto. For instance, a scenario generated by the scenario generator [104] may be in the following form:

Example Scenario 1

When Http GET request is made to/products/1

Then the response should include product 1 details

Example Scenario 2

When a message is received on channel named "messages"

And it has payload [{"message": "{string}" }]

Then the message is acknowledged

For the ease of understanding, let us consider the following example:

| SCENARIOS | CAUSE | EFFECT |
|-----------|-------|--------|
| X | C1 | E1 |
| Y | C2 | E2 |
| Z | C3 | E3 |

As shown in the above example, the set of scenarios each comprises at least a cause and at least an effect.

Further, the set of expectations are essentially data that adhere to the cause and effect in a scenario, say for a scenario X following may be the set of expectations:

EX11=C1.a, E1.a

EX12=C1.b, E1.b where EX11 and EX12 are expectations for the same scenario X, C1.a is a specific request and E1.a is the response for the request C1.a.

In another example, for scenario Y, the following set of expectations may be received:

EY1=C2.a, E2.a

EY2=C2.d, E2.e

Furthermore, the system [100] comprises at least one processing unit [106] that is connected to at least one scenario generator [104], at least one storage unit [108], at least one synchronous protocol server [110] and at least one asynchronous protocol server [112]. The processing unit [106] is configured to compare the set of expectations with the set of scenarios. Further, the processing unit [106] is configured to identify a set of valid expectations and a set of invalid expectations from the set of expectations based on the comparison between the set of expectations and the set of scenarios. The set of valid expectations include those expectations from the set of expectations that match with the set of scenarios. Each expectation in the set of valid expectation matches with only one scenario. The set of invalid expectations include those expectations from the set of expectations, that do not match with any scenario from the set of scenarios. Each expectation in the set of invalid expectations either does not match with any scenario or matches with multiple scenarios.

Continuing with the above example, let us assume to add below expectations to the system [100] that has been initialized with above scenarios:

EX1=C4.a, E3.a

EX2=C3.a, E3.a

Where the expectations EX1 and EX2 may be compared with the set of scenarios i.e., each expectation may go through a matching process, as illustrated below:

1. Match Cause

Here EX1 will get filtered out because cause data "a" in C4 does not match any cause in any scenario. However EX2 cause data "a" in C3 matches with the cause of scenario Z so it goes to next step. Thereby, the EX1 expectation is an invalid expectation.

2. Match Effect

EX2 expectation effect matches with scenario Z, hence, it is considered a valid expectation.

Thereby, if both cause and effect match a preloaded scenario, then the expectation is allowed or considered valid.

In case an expectation in the set of expectations includes any additional information apart from request and response, then such additional information is not used by the processing unit [106] for matching with the scenarios.

Furthermore, the system [100] comprises a storage unit [108] connected at least to the processing unit [106] and the scenario generator [104], wherein the storage unit [108] is configured to store the set of valid expectations and the set of scenarios. In the above example, EX2 being a valid expectation, is stored in the storage unit [108]. The storage unit [108] may comprise separate storage space to store error logs, expectation storage [310] and interaction storage [320]. The expectation storage [310] stores the set of expectations received at the system [100] and the set of valid expectations identified by the system [100]. The interaction storage [320] stores interactions between the system under test [326] and the system [100]. The error log stores all error messages generated by the system [100].

The communication unit [102] is further configured to receive a set of requests. In an implementation, the communication unit [102] may receive the set of requests from the system under test [326]. The set of requests may include one or more requests that are synchronous requests or asynchronous requests. In an implementation, the set of requests may be a set of HTTP requests, represented as below which can arrive simultaneously at the communication unit [102] and are also serviced simultaneously by the processing unit [106]:

GET/products/1 header: traceId=abcd123124

POST/products/header: traceId=abcd12 request-body: {"name": "book", "price": 10.00}

In another implementation, the set of requests may be a combination of asynchronous set of requests and synchronous set of requests but the present disclosure is not limited thereto.

The processing unit [106] is further configured to service, the set of requests based at least on the set of valid expectations and the set of scenarios. The detailed process flow for servicing requests has been described in further detail later in this description.

Further, the processing unit [106] services the set of requests and simultaneously also continuously and dynamically monitors the set of specifications to identify one or more changes in the at least one specification from the set of specifications. The one or more changes in the at least one specification, say an API specification, may encompass deleting a response field, modifying a resource, modifying a method URL, modifying a field name and/or like changes that are obvious to a person skilled in the art. These changes in the specification may be made by the user or the developer, but the disclosure is not limited thereto.

Further, the scenario generator [104] is further configured to dynamically update the one or more scenarios in the set of scenarios to generate an updated set of scenarios based on the identified changes in the at least one specification. In an implementation, the each updated scenario in the updated set of scenarios is assigned a version number by the scenario generator [104]. For instance, if a previously existing scenario S1 is updated and the previous version of S1 is V.0 then the updated scenario S1 is assigned the version number V.1. Further, in an event the set of specifications comprises a plurality of specifications, the scenario generator [104] is further configured to generate the updated set of scenarios for each specification from the plurality of specifications.

Furthermore, the processing unit [106] is further configured to compare the set of expectations with the updated set of scenarios and dynamically identify, an updated set of valid expectations based on the comparison between the set of expectations and the updated set of scenarios. If any changes are made to the at least one specification from the set of specifications, the set of scenarios are updated by the processing unit [106] and the set of valid expectations is also updated. Thus, set of valid expectation in storage unit [108] is always in line with the updated set of specifications and any further expectations received at the communication unit [102] are now compared by the processing unit [106] with the updated set of scenarios. Thereafter, the storage unit [108] is further configured to store the updated set of valid expectations and the updated set of scenarios. The system [100] by continuously monitoring the specification and the corresponding one or more scenarios and dynamically updating the expectations, solves the stale stub problem as encountered by the existing solutions.

Any requests received after the set of scenarios and the set of valid expectations have been updated as mentioned above, are referred to as set of new requests. The communication unit [102] is configured to receive a set of new requests. The set of new requests are also received from the system under test [326]. Further, the processing unit [106] is configured to service the set of new requests based at least on the updated set of valid expectations and the updated set of scenarios. The terms 'set of requests' and 'set of new requests' have been used in this specification only to clarify the timing at which such request is received. The 'set of requests' include requests that are received after the start of the proxy server, when no changes have been made to the set of scenarios, based on changes in the set of specifications. The 'set of new requests' include requests that are received after the set of scenarios have been updated based on the changes in the set of specifications. Thus, the content of the requests in the 'set of requests' and the 'set of new requests' may be same or different, but the timing at which such request has been received is different as indicated above. It will be appreciated by those skilled in the art that such distinction has been drawn only for notational purposes and these terms do not restrict the scope of the present disclosure in any manner.

In an implementation, the processing unit [106] is further configured to service, a new requests based on the version number and a scenario content of one or more scenarios from the set of updated scenarios. Version number may be a timestamp such as 28.04.2023; 11:03:05 or a numerical representation such as v1, v2, etc. The processing unit [106] is configured to service the set of new requests based on the latest scenario. For example, if a request is compared with scenario S1 that has 2 versions v1 and v2, the processing unit [106] is configured to use version v2. In another example, if a request is compared with scenario S1 that has 2 versions with timestamp 28.04.2023; 11:03:05 and 29.04.2023; 1:25:05, the processing unit [106] is configured to use version with timestamp 29.04.2023; 1:25:05 for comparison.

Further, in an event the set of requests comprises a plurality of requests, the processing unit [106] is further configured to service the set of requests simultaneously service the plurality of requests based on the subset of scenarios for each specification from the plurality of specifications.

Also, in an event the set of new requests comprises a plurality of new requests, the processing unit [106] is further configured to service the plurality of new requests simultaneously based on the updated subset of scenarios for each specification from the plurality of specifications.

Further, the set of expectations comprises one or more expectations that are one of a persistent expectation and a transient expectation.

A persistent expectation is a type of expectation which, once configured/set on the proxy server, is available for the entire duration for which the proxy server is running. And for this entire duration, the same behavior is seen no matter how many times an expectation is invoked/exercised, i.e., the persistent expectation is configured in a manner that every time the expectation is invoked, it provides the same or consistent output or response or behavior as defined in the expectation. For Example, in the synchronous scenario, say the expectation set is as follows:

```
{
    "http-request": {
        "path": "/products/1",
        "method": "GET"
    },
    "http-response": {
        "status": 200,
        "body": {
            "name": "Mobile phone holder",
            "price": 10,
            "category": "electronics accessories",
            "imageUrl": "https://images.example.com/products/1.jpeg"
        },
        "status-text": "OK"
    }
}
```

Since this is set as a persistent expectation, any number of times the proxy server receives a request "GET/products/1", it always returns the same response:

"name": "Mobile phone holder",

"price": 10,

"category": "electronics accessories",

"imageUrl":  "https://images.example.com/products/1.jpeg"

Similarly, in JMS expectation, where the proxy server is emulating a message receiver, matching messages as per the expectation are considered valid for any number of occurrences of receiving such messages.

Static stubs (those that are configured at proxy server startup time, explained above) by virtue of how they are set up are always persistent. However dynamic expectations (those which can be configured after the proxy server has started via the http expectations API) can be persistent or transient.

A transient expectation has a fixed lifetime within the duration for which the proxy server is running. During this fixed lifetime, the behavior or effect will be as per the expectation when there is a matching request, message, etc. Once the lifetime of the transient expectation is complete, the behavior can be one of auto-generated behavior and a fallback expectation if available. For instance, if the expectation is set that a specific response: "Successfully Delivered" is to be provided only if the request is received within two hours of the transient expectation being set, then in such a case, the response "Successfully Delivered" is generated only if the request is received within two hours of the transient expectation being set. If the request is received at any time other than within two hours of the transient expectation being set, the response "Successfully Delivered" is not generated and instead another automatically generated response is provided, such as say, "Unable to process this request due to timeout".

Lifetime of any transient expectation can be the number of times it can be exercised, a hard time limit during which it is active (Example: hour of day, next X minutes, etc.), etc. Also, a transient expectation can be set to temporarily override a persistent expectation.

Further, several transient expectations, all pertaining to a single scenario belonging to the at least one specification that has been configured on the proxy server, can be bunched as a sequence and set up on the proxy server. Each expectation in this sequence is matched, exercised, discarded in the order in which they were received in conjunction with the fixed lifetime set for each expectation in that sequence. In an event the set of expectations includes the sequence of transient expectations, the processing unit [106] is further configured to compare each sequence of transient expectations with each scenario from the one or more scenarios and validate the sequence of transient expectations based on the comparison. In the above example, the sequence of transient expectations may be receiving both EX1 and EX2 i.e., a block of expectations, which are then compared with scenario X. Furthermore, the set of expectations comprises a sequence comprising a plurality of transient expectations in an order. For instance, a sequence of plurality of transient expectations may be EX1→EX2→EX3. This sequence contains three expectations in a particular order, i.e., EX1 followed by EX2 followed by EX3. In an event the set of expectations comprises such a sequence comprising a plurality of transient expectations in an order, the processing unit [106] is configured to compare, in the order, each transient expectation in the sequence with each scenario from the updated set of scenarios. In the above example, the processing unit [106] compares EX1 with the updated set of scenarios, followed by EX2 and EX3 being compared with the updated set of scenarios. Further, the processing unit [106] is configured to validate the sequence based on the comparison to generate a sequence validation result, wherein the sequence validation result is one of a successful result and an unsuccessful result. The sequence validation result is the successful result in an event each expectation in the sequence matches with one and only one scenario from the updated set of scenarios, and the sequence validation result is the unsuccessful result in an event at least one expectation in the sequence does not match with a scenario from the updated set of scenarios. Consider another example, suppose two sequences of transient expectations is received in an order, say:

Order 1: EX1, EX2 and EX3
Order 2: EX4 and EX5.

Where the sequence of transient expectations are received and processed in order, here order 1 is processed and then order 2 is processed.

Further, the processing unit [106] is further configured to generate, an expectation identifier for each expectation, in the set of valid expectations, wherein the expectation identifier may be at least numeric constant, alphanumeric constant, and/or like formats that are obvious to the person skilled in the art. Also, the communication unit [102] is further configured to provide, the expectation identifier for each expectation in the set of valid expectations. In the above example, EX2 may be considered as an expectation identifier for the valid expectation.

The processing unit [106] is further configured to identify a set of protocols based on the set of specifications, wherein each protocol from the set of protocols is one of a synchronous architecture protocol and an asynchronous architecture protocol. For instance, OpenAPI specification may use a HTTP or rest server, AsycnAPI specification with JMS protocol may use a JMS broker. Further, based on the identified set of protocols the processing unit [106] is configured to identify a set of protocol servers, wherein each protocol server in the set of protocol servers is one of a synchronous protocol server [110] and an asynchronous protocol server [112]. In an implementation, the protocol server is a part of the proxy server and is a pluggable or dynamically bound unit which is selected based on the protocol of the specification. For instance, OpenAPI will leverage a server like ktor, AsyncAPI, JMS protocol may leverage a suitable JMS server etc. Thus, if the specification under consideration is a synchronous protocol such as HTTP then the relevant protocol server identified by the processing unit [106] is the synchronous protocol server [110].

In order to service the set of new requests (as described above), by the processing unit [106] the synchronous protocol server [110] receives, at least one new request based on the set of new requests and compares the at least one new request with the updated set of scenarios to generate one of a successful scenario matching result and an unsuccessful scenario matching result. A successful scenario matching result is generated when the received at least one new request matches with the updated set of scenarios. An unsuccessful scenario matching result is generated when the received at least one new request does not match with the updated set of scenarios.

Further, in an event of generation of the successful scenario matching result, the synchronous protocol server [110] is configured to identify a target scenario based on the comparison of the received at least one new request with the updated set of valid expectations to generate one of a successful expectation matching result and an unsuccessful matching result. A target scenario is a scenario from the updated set of scenarios that matches with the at least one new request. A successful expectation matching result is generated when the received at least one new request matches with the updated set of valid expectations. An unsuccessful expectation matching result is generated when the received at least one new request does not match with the updated set of valid expectations.

The synchronous protocol server [110] is further configured to identify at least one target expectation from the set of valid expectations based on the comparison of the at least one request received at the synchronous protocol server [110] and the updated set of valid expectations. A target expectation is an expectation (from the updated set of valid expectations) that matches with the request received at the synchronous protocol server [110]. For example, if the received request is R.a—GET/products/10 which matches with the expectation EX11, then EX11 is identified as the target expectation. Further, the storage unit [108] is further configured to store the at least one target expectation.

Also, the synchronous protocol server [110] is further configured to generate a response based on comparison of the received at least one new request with and the updated set of valid expectations.

In an event of generation of the unsuccessful scenario matching result, the synchronous protocol server [110] is further configured to generate a scenario matching error response.

In continuation with the above example, consider the following:

A set of requests is received, represented as follows R.<Data instance name>, say:
1. R.a—GET/products/10
2. R.b—GET/products/12
3. R.c—GET/products/13
4. R.n—GET/products/25

Consider that the scenarios generated by the scenario generator [104] are as follows:

Now, R.a matches C1.a, so the synchronous protocol server [110] returns the response E1.a. Similarly, R.b matches C1.b, so the synchronous protocol server [110] returns response E1.b. R.c does not match C1.a or C1.b, however the data instance "c" in R.c matches C1 as per the specification, so synchronous protocol server [110] returns response E1.c. Also, R.n does not match any expectation, so the synchronous protocol server [110] returns an error or an autogenerated response based on the mode of operation of the synchronous protocol server [110] as described in the ensuing paragraphs.

Based on the comparison, the synchronous protocol server [110] is further configured to identify a current operation mode, wherein the current operation mode is one of a strict mode and a lenient mode. In an implementation, when the system [100] operates in a strict mode, the system [100] is configured to generate response for only those requests for which an expectation has been set. For any other requests, i.e., for any request for which an expectation has not been set even if the request is as per the specification (matches with the one or more scenarios), the system [100] is configured to generate an error response. In another implementation, when the system [100] operates in lenient mode, the system [100] is configured to generate response for all types of requests as long as they match a scenario in the updated set of scenarios. In the lenient mode, response for a request for which expectation has been set, is generated as per the set expectation; and response for a request for which no expectation has been set, is autogenerated by providing a random value in line with the data type and format as per the scenario that the request matched.

Furthermore, in an event the current operation mode is a strict mode, the synchronous protocol server [110] is further configured to generate one of an error response and a response as per the updated set of valid expectations, wherein the error response is generated in an event of generation of the unsuccessful expectation matching result and the response as per the updated set of valid expectations is generated in an event of generation of the successful expectation matching result.

Additionally, in an event the current operation mode is the lenient mode, the synchronous protocol server [110] is further configured to generate one of an autogenerated response and a response based on the updated set of valid expectations, wherein the autogenerated response is generated in an event of generation of the unsuccessful expectation matching result, and the autogeneratedresponse based on the target scenario, wherein the response is based on the updated set of valid expectations is generated in an event of generation of the successful expectation matching result. The response generated by the synchronous protocol server [110] is based on the target scenario, where the response based on the updated set of valid expectations. For instance, say a request R1 matches with the scenario S1, but the request R1 does not match with any expectation from the set of valid expectations. In this situation, the synchronous protocol server [110] generates an autogenerated response based on the scenario S1.

The asynchronous protocol server [112], to service the set of new requests, is further configured to receive at least one message based on the set of new requests; compare the received at least one message with the updated set of scenarios to generate one of the successful scenario matching result and the unsuccessful scenario matching result. A successful scenario matching result is generated when the received at least one message matches with a scenario from the updated set of scenarios. An unsuccessful scenario matching result is generated when the received at least one message does not match with a scenario from the updated set of scenarios. Also, the message is composed by a header (metadata such as identification) and a body and is usually sent through asynchronous protocols like AMQP that are obvious to a person skilled in the art. In an event of generation of the successful scenario matching result, the asynchronous protocol server [112] is configured to identify a target scenario based on the comparison of the received at least one message with the updated set of scenarios and compare the received at least one message with the updated set of valid expectations to generate one of the successful expectation matching result and the unsuccessful expectation matching result. Further, in an event of generation of the successful expectation matching result, the asynchronous protocol server [112] is configured to identify a target expectation based on the comparison of the received at least one message with the updated set of valid expectations and store at the storage unit [108], the received at least one message, the target scenario and the target expectation. The successful expectation matching result is generated when the received message matches with a valid expectation from the updated set of valid expectations; and the negative expectation matching result is generated when the received message does not match with any valid expectation from the updated set of valid expectations.

In order to service the set of new requests (as described above), by the processing unit [106], the asynchronous protocol server [112] receives a trigger comprising at least one expectation identifier based on the set of new expectations. A "Trigger" is an initiation request that is sent by a device to the proxy server in case an interaction has to originate from the proxy server to the application/system under test [326] that is configured to work with it. For example, in cases where the proxy server is a message sender since the interaction between application and proxy server cannot originate as a result of an action performed on the application, a trigger/initiation request is made to the proxy server so that the proxy server can originate the interaction with the application/system under test [326].

The asynchronous protocol server [112] is further configured to match the at least one expectation identifier (received in the trigger) with stored in the storage unit [108] to generate an expectation identifier matching result, wherein the expectation identifier matching result is one of a successful expectation identifier matching result and an unsuccessful expectation identifier matching result. In an event of generation of the unsuccessful expectation identifier matching result: communication unit [102] is configured to transmit device, an error message. A successful expectation identifier matching result is generated when a received expectation identifier matches with an identifier from the stored expectation identifiers. An unsuccessful expectation identifier matching result is generated when a received expectation identifier does not match with any identifier from the stored expectation identifiers.

In an event of generation of the successful expectation identifier matching result: asynchronous protocol server [112] is configured to retrieve from the storage unit [108] at least one target expectation corresponding to the at least one expectation identifier, wherein the at least one target expectation comprises a message and a timer. Furthermore, the asynchronous protocol server [112] is further configured to transmit to the device, the message of the at least one expectation. Further, at least one expectation identifier in the trigger, the at least one target expectation and the message is stored at the storage unit [108].

Furthermore, the asynchronous protocol server [112] is configured to record a time of transmission of the message and start a timer, wherein the timer is configured to expire at the end of the timeout duration. Thereafter, the asynchronous protocol server [112] is configured to determine a status of delivery of the message based at least on the time of transmission of the message and the timeout duration.

In an implementation, if the asynchronous protocol being used by the asynchronous protocol server [112] supports an acknowledgement mechanism, then determination of the status of delivery of the message includes identification one of:

1. A first event comprising a receipt of an acknowledgement prior to an expiry of the timer,
2. A second event comprising an expiry of the timer and an acknowledgement is not received prior to an expiry of the timer, In an implementation, the asynchronous protocol server [112] is configured to also identify a third event comprising a receipt of an acknowledgement subsequent to an expiry of the timer.

Acknowledgement includes receipt of an acknowledgement signal from the System under test [326] by means of message but the disclosure is not limited to this and may incorporate other acknowledgement mechanisms.

In this implementation, asynchronous protocol server [112] is configured to determine a status of delivery of the message based on the identification of one of the first event and the second event, wherein the determined status of delivery of the message is one of a successful status and an unsuccessful status, and wherein the determined status is the successful status in an event of identification of the first event and the determined status is the unsuccessful status in an event of identification of the second event; and subsequently, store at the storage unit [108], the determined status of delivery of the message.

A successful status is obtained when the acknowledgement is received is well within the set timer. An unsuccessful status is obtained when the acknowledgement is not received within the set timer.

In another implementation, if the asynchronous protocol being used by the asynchronous protocol server [112] does not support an acknowledgement mechanism, then determination of the status of delivery of the message includes identification of one of:

1. A fourth event comprising transmission of the message prior to the expiry of the timer; and
2. A fifth event comprising expiry of the timer prior to the transmission of the message.

In this implementation, the asynchronous protocol server [112] is configured to determine a status of delivery of the message based on the identification of one of the fourth event and the fifth event, wherein the determined status of delivery of the message is one of a successful status and an unsuccessful status. The determined status is the successful status in an event of identification of the fourth event and the determined status is the unsuccessful status in an event of identification of the fifth event, and subsequently, the asynchronous protocol server [112] stores at the storage unit [108], the determined status of delivery of the message.

A successful status is obtained when the time of transmission of the message is well within the set timer. An unsuccessful status is obtained when the time of transmission is not within the set timer.

The expectation received at the asynchronous protocol server [112] is in the form of {Message, Timeout}, wherein a successful delivery of the message has to be within the specified time otherwise, it may result into two possibilities namely, error message or message not picked up.

The timeout is associated with each expectation and acts like an exit condition. Consider the following example:

```
Timer (60s) {
    sendMessage (message)
} TimeOutError {
    Respond to trigger at timeout;
    Update interaction store with timeout error
}
```

In this example, if the message is delivered in 60 seconds, then it is considered as a successful delivery and a positive status is generated. However, if the message is not delivered within 60 seconds, then it is considered as an unsuccessful delivery and a negative status is generated.

Furthermore, the communication unit [102] is further configured to: receive from the client device, at least one verification request comprising matching details. The verification request is typically received from a device where a user wants to check if an interaction has occurred between the system under test [326] and the system [100] in the past for a specific expectation and/or what are the details of the interaction that has occurred in the past for a specific expectation. The verification request thus comprises the matching details of the expectation for which the user wishes to perform the verification. The processing unit [106] is further configured to compare, the received at least one verification request with a set of interactions stored in the storage unit [108] to generate one of a successful result and an unsuccessful result. In an event of generation of the successful result, the processing unit [106] is configured to retrieve from the storage unit [108], one or more interactions associated with the matching details in the received verification request, and the processing unit [106] configured to provide to the device, the retrieved one or more interactions. Further, in an event of generation of the unsuccessful result, the processing unit [106] configured to generate, an error response and the processing unit [106] configured to provide to the device, the error response. These retrieved one or more interactions from the storage unit [108] represent the interactions that have occurred in the past for that specific expectation for which the verification request was received. For example, consider that the verification request received is: R.1-EX1. Then, the processing unit [106] retrieves from the storage unit [108] all the past interactions associated with the expectation identifier EX1. In another example, say the verification request is: R.1-GET/products/1. Then, the processing unit [106] retrieves from the storage unit [108] all interactions that match with the request "GET/products/1". In another example where the proxy-server/system is emulating a message receiver, the verification requests is: R.3—Channel: "Orders", Payload: "VendorId: {int}". Then the processing unit [106] retrieves from the storage unit [108] all interactions that match with the request "Channel: "Orders", Payload: "VendorId: {int}"".

A person skilled in the art would appreciate that the above list of features is only exemplary and does not restrict the disclosure in any possible manner.

In an implementation of the present disclosure, the present invention encompasses a computer readable medium comprising instructions, which when executed cause a processor to perform a method for validating a set of expectations based on a set of specifications. Said method comprises receiving the set of specifications and generating a set of scenarios based on the received set of specifications. Further, the method comprises dynamically receiving the set of expectations. The method further encompasses comparing the set of expectations, with the set of scenarios and identifying a set of valid expectations and a set of invalid expectations from the set of expectations based on the comparison between the set of expectations and the set of scenarios. Further, the method comprises storing the set of valid expectations and the set of scenarios and receiving a set of requests. The method further encompasses servicing, the set of requests based at least on the set of valid expectations and the set of scenarios, while servicing the set of requests, simultaneously performing: continuously and dynamically monitoring the set of specifications to identify one or more changes in the at least one specification from the set of specifications. The method further comprises dynamically updating the one or more scenarios to generate a one or more updated scenarios based on the identified changes in the at least one specification. The said method further encompasses comparing the set of expectations with the one or more updated scenarios. Further, the method comprises dynamically updating the set of valid expectations and the set of invalid expectations to generate an updated set of valid expectations based on the comparison between the set of expectations and the one or more updated scenarios. Thereafter, the method comprises storing the updated set of valid expectations.

Referring to FIG. 2, exemplary method flow diagram [200], for validating a set of expectations based on a set of specifications, in accordance with exemplary embodiments of the present invention is shown. In an implementation, the method is performed by the system [100]. Further, in an implementation, the system [100] may be present in a consumer device to implement the features of the present invention. The method may begin when a user via a device interacts with the communication unit [102] for validating the set of expectations based on the set of specifications. Also, as shown in FIG. 2, the method starts at step [202] and proceeds to step 204. The method comprising receiving, at a communication unit [102] the set of specifications, where the set of specifications may comprise one of OpenAPI, AsyncAPI, Swagger, API Blueprint, RAML and/or any combination thereof, but the disclosure is not limited thereto. The set of specifications may include one or more specifications. The present invention encompasses receiving and subsequent handling/processing of multiple specifications.

At step 206, the method comprises generating, by a scenario generator [104], a set of scenarios based on the received set of specifications. Each scenario includes at least a cause and at least an effect, wherein the cause is a possible action and the effect is the form of a response. For instance, the cause may be a HTTP request in the form of:

Cause: (Method, URL/path, headers, request body)
or a JMS request but the disclosure is not limited thereto. Further, the effect may be a HTTP response in the form of:

Effect: (Content-type, Headers, Response-body)
but the disclosure is not limited thereto. Further, each scenario from the set of scenarios comprises a version number and a scenario content, where the scenario content comprises the cause and the effect. The version number gets updated when the scenario content of any scenario is updated. Version number may be a timestamp such as 28.04.2023; 11:03:05 or a numerical representation such as v1, v2, etc.

For the ease of understanding, consider the following example where the set of scenarios comprises three scenarios S1, S2 and S3 that are generated by the scenario generator [104] based on the received set of specifications

| SCENARIO ID | SCENARIO | CAUSE | EFFECT |
|---|---|---|---|
| S1 | When GET/products/ {number: 1 . . . 3} Then product name | GET/products/ {number: 1 . . . 3} | Product name |
| S2 | When POST/ message/{URL} Then text message | POST/message/ {URL} | Text message |
| S3 | When GET/articles/ {number: 10 . . . 30} Then article name | GET/articles/ {number: 10 . . . 30} | Article name |

These scenarios may be stored in the storage unit [108] for further processing. In an event, the set of specifications includes a plurality of specifications, this step of generating the set of scenarios comprises generating a subset of scenarios for each specification from the plurality of specifications. For instance, if two specifications A and B are received at the communication unit [102], the invention encompasses a subset of scenarios for specification A and another subset of scenarios for specification B.

The method further comprises, at step 208, dynamically receiving at the communication unit [102], the set of expectations, where the set of expectations includes a request-response mapping. The set of expectations may be received all at once or in parts over a period of time. Continuing with the above example, expectations for Scenario S1 may be represented as follows:

EX1: Request: GET/products/1; Response: "Big Panda & Tiny Dragon"

EX2: Request: GET/products/2; Response: "Patent Law Basics"

EX3: Request: GET/products/4; Response: "The Discovery of India"

Where EX1, EX2 and EX3 comprises the set of expectations.

The set of expectations received at the system [100] may include one or more persistent expectations and one or more transient expectations. Further, several transient expectations, all pertaining to a single scenario belonging to the at least one specification that has been configured on the proxy server, can be bunched as a sequence and set up on the proxy server. The invention encompasses that the set of expectations comprises a sequence comprising a plurality of transient expectations in an order.

At step 210, the method encompasses comparing, by a processing unit [106], the set of expectations with the set of scenarios. In the above example, each expectation EX1, EX2 and EX3 is compared with each of the scenarios S1, S2 and S3. In an event the set of expectations comprises a sequence comprising a plurality of transient expectations in an order, the invention encompasses comparing, in the same order, the transient expectations in the sequence with each scenario from the updated set of scenarios. Example of comparing sequence of transient expectations is provided below:

1. EX11: Request: GET/products/1; Response: Effective Java Edition 1, Lifetime: Once 2. EX12: Request: GET/products/1; Response: Pragmatic Programmer, Lifetime: Once 3. EX13: Request: GET/products/1; Response: Beautiful Code, Lifetime: Once When a sequence of transient expectations are received they are first validated to confirm that they all have the exact same cause. In this example, that would be method GET and URL with path parameters etc. If any of expectations in the sequence have a different cause then the entire sequence is rejected. In the above sequence of transient expectations (please note the Lifetime attribute which says that it expires after it is exercised once) the first expectation EX11 is compared with each of the scenarios S1, S2 and S3. Since EX11 matches S1, remaining expectations in the sequence EX12 and EX13 will automatically match with S1 and they are stored in the Expectation Storage and are serviced in the same order. A negative matching result is generated if EX11 does not match any scenario in the set of scenarios.

Further, at step 212, the method comprises identifying, by the processing unit [106] a set of valid expectations and a set of invalid expectations from the set of expectations based on the comparison between the set of expectations and the set of scenarios. The set of valid expectations from the set of expectations include those expectations that match with the set of scenarios. Each expectation in the set of valid expectation matches with one and only one scenario. The set of invalid expectations include those expectations from the set of expectations that do not match with any of the scenarios. Each expectation in the set of invalid expectations either does not match with any scenario or matches with multiple scenarios. As per the given example, EX1, say is a valid expectation as it matches with scenario S1 and EX2 is also a valid expectation as it matches with scenario S1. Thus, EX1 and EX2 form the set of valid expectations. Further, since EX3 does not match with any scenario, EX3 forms the set of invalid expectations.

In an event the set of expectations comprises a sequence comprising a plurality of transient expectations in an order, the invention encompasses, validating the sequence based on the comparison between the transient expectations in the sequence with each scenario from the updated set of scenarios. This validation generates a sequence validation result, wherein the sequence validation result is one of a successful result and an unsuccessful result. The sequence validation result is the successful result in an event each expectation in the sequence matches with a scenario from the updated set of scenarios and the sequence validation result is the unsuccessful result in an event at least one expectation in the sequence does not match with a scenario from the updated set of scenarios or if the transient expectations match with a scenario from the updated set of scenarios but in an order different from the order of the received sequence.

In the previous example, EX11, EX12 and EX13 comprise a sequence of transient expectations and are processed in the order EX11→EX12→EX13.

Thereafter, at step 214, the method comprising storing, at a storage unit [108] the set of valid of expectations and the set of scenarios. Further, the method encompasses discarding the set of invalid expectations and reporting the same both to the user/device that sent the expectations to the communication unit [102]. Further, the method encompasses storing the set of invalid expectations as part of a separate error log at the storage unit [108].

Further, at step 216, the method comprises receiving, at the communication unit [102], a set of requests. The set of requests may be a synchronous request, an asynchronous request or a combination thereof. The invention also encompasses that the set of requests comprises a plurality of requests, wherein the plurality of requests are simultaneously serviced.

Next, at step 218, the method further comprises servicing, by the processing unit [106], the set of requests based at least on the set of valid expectations and the set of scenarios. A more detailed description of how the set of requests are serviced is provided further below in this disclosure. Also, servicing, by the processing unit [106], the set of requests is further based on the version number and the scenario content of one or more scenarios from the set of scenarios. While servicing the set of requests, the invention encompasses simultaneously performing steps 220 to 228.

At step 220, the invention encompasses continuously and dynamically monitoring, by the processing unit [106], the set of specifications to identify one or more changes in at least one specification from the set of specifications. The one or more changes in the set of specifications may encompass deleting a response field, modifying a field name, deleting a field resource and/or like changes that are obvious to the person skilled in the art. These changes in the specification may be made by the user, or the developer, but the disclosure is not limited thereto. In an implementation, the processing unit [106] dynamically monitors the one or more changes in the set of specifications through a specification watcher [302], which is a pluggable or dynamically bound unit. This step thus essentially involves continuously and dynamically monitoring the received specification and comparing the same with the previously stored version to check if any portion of the specification has been updated or modified.

Furthermore, the method at step 222, incorporates dynamically updating, by the scenario generator [104], the one or more scenarios in the set of scenarios to generate an updated set of scenarios based on the identified changes in the at least one specification. Furthermore, in an event the set of specifications comprises a plurality of specifications, the generating, by the scenario generator [104], the updated set of scenarios comprises generating an updated subset of scenarios for each specification that has been updated.

Thereafter, at step 224, the method further comprises comparing by the processing unit [106], the set of expectations with the updated set of scenarios. Continuing with the above example, now the expectations EX1, EX2 and EX3 are compared with updated scenario S1 and other scenarios S2 and S3.

At step 226, dynamically identifying by the processing unit [106], an updated set of valid expectations based on the comparison between the set of expectations and the updated set of scenarios. Thus, the set of valid expectations is always in line with the updated specification. Now referring to the above example, when the set of expectations EX1, EX2 and EX3 are compared with updated scenario S1 and other scenarios S2 and S3, the processing unit [106] determines that EX1, EX2 and EX3 matches with the updated scenario S1. Thus, EX1, EX2 and EX3 form the updated set of valid expectations and the updated set of invalid expectations is a null set.

Subsequently, at step 228, the method comprises storing, at the storage unit [108], the updated set of valid expectations and the updated set of scenarios. Thereafter, at step 230, the method incorporates receiving at the communication unit [102] a set of new requests. The set of new requests may be a synchronous request, an asynchronous request or a combination thereof but the disclosure is not limited thereto. Finally, at step 232, the method encompasses servicing, by the processing unit [106], the set of new requests based at least on the updated set of valid expectations and the updated set of scenarios. Also servicing, by the processing unit [106], the set of new requests is further based on the version number and the scenario content of one or more scenarios from the set of updated scenarios. In an event, the set of new requests comprises a plurality of new requests, this step of servicing the set of new requests comprises simultaneously servicing the plurality of requests based on the subset of scenarios for each specification from the plurality of specifications.

The method also encompasses storing every interaction between the system under test [326] and the system [100]. For instance, if a request R1 is received, this request say matches with scenario S1 and with expectation EX1 and the response generated for this request R1 is RES1, then all this information, i.e., the request R1, the matching scenario S1, the matching expectation EX1 and the response RES1 is stored as an interaction in the storage unit [108].

The method terminates at step 234.

Figure 3:
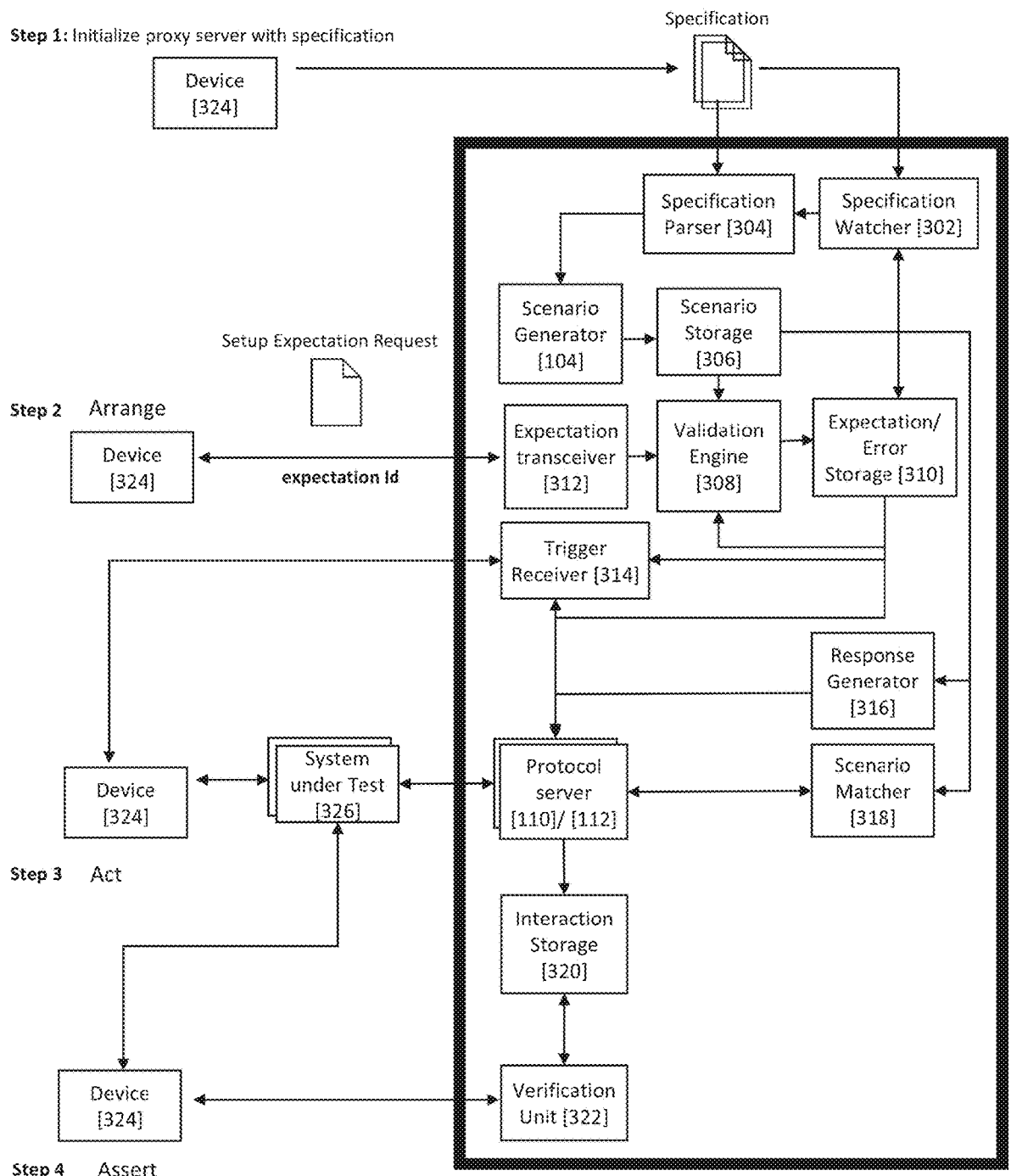
FIG. 3 illustrates an exemplary situation in which exemplary embodiments of the systems and methods of the present invention are implemented, in accordance with the exemplary embodiments of the present invention.

FIG. 3, illustrates an exemplary situation in which exemplary embodiments of the systems and methods of the present invention are implemented. The method flow may essentially be bifurcated into four steps primarily, namely initialize, arrange, act and assert, but the disclosure is not limited thereto.

At step 1, the system [100] is initialized with a set of specifications, where the set of specifications may be one of OpenAPI, AsyncAPI, Swagger, API Blueprint, RAML and/or any combination thereof, but the disclosure is not limited thereto.

Further, the system [100] comprises a specification parser [304] that parses the received set of specifications, where specification is a machine parseable document which describes, say an application programming interface specification. The specification parser [304] is capable of parsing and interpreting any type of specification and is also capable of parsing and interpreting multiple specifications parallely or sequentially. The disclosure also encompasses an adapter layer that is configured to convert the parsed specification into a standardized format. Furthermore, the system [100] comprises a scenario generator [104] that is configured to process the parsed specification or the standardized format/ translated versions of the parsed specifications, to generate all possible scenarios. Each scenario includes at least a cause and at least an effect but the disclosure is not limited thereto. For instance, a scenario generated by the scenario generator [104] may be in the following form:

S1: When HTTP GET request is made to/article/1
    Then the response should include article 1 details The scenarios generated by the scenario generator [104] may be stored such that these scenarios can later be used in the subsequent phases.

The initialize phase also encompasses continuous monitoring of the specification by a specification watcher [302]. The specification watcher [302] is configured to monitor the set of specifications and identify any changes or modifications in the set of specifications. In case any changes or modifications are detected by the specification watcher [302], it is configured to provide such updates to the specification parser [304]. In this situation, the specification parser [304] again parses the specification and provides updates to the scenario generator [104]. The scenario generator [104] then updates the scenarios generated earlier based on the updated specifications. In this manner, the specification watcher [302] ensures that any changes in the specification are communicated to the specification parser [304]/scenario generator [104] so that the scenarios generated by the scenario generator [104] are always in line with the latest version of the specification.

Now, step 2 comprises an arrange phase, where a set of expectations are set up and received by an Expectation Receiver. The expectation receiver may receive the set of expectations from a device, where the device may be an electronic device, an actor device or a user device that may be obvious to a person skilled in the art. Each expectation from the set of expectations includes a request-response mapping for expectations pertaining to synchronous operations, and a message and message action combination for expectations pertaining to asynchronous expectations. An exemplary expectation for a scenario may be represented as follows:

Request: GET/articles/1; Response: "PEN"

The expectation transceiver [312] is configured to generate a matching detail for each expectation in the set of expectations. The expectation identifier of each expectation is then provided by the expectation transceiver [312] back to the device [324] from which the set of expectations were received.

In the arrange phase, the received set of expectations are validated by the validation engine [308] based on the scenarios generated by the scenario generator [104] and subsequently stored in the storage unit [108]. The validation engine [308] is configured to receive the set of expectations from the expectation transceiver [312] and retrieve the scenarios from the scenario storage [306]. Further, the validation engine [308] is configured to compare the set of expectations with the set of scenarios. Upon validation, the corresponding validation result is stored in the expectation storage [310]. The validation result may be a positive matching result and a negative matching result. The positive matching result is generated when an expectation matches with one or more scenarios and the negative matching result is generated when an expectation does not match with any scenario. The validation engine [308] is configured to identify a set of valid expectations and a set of invalid expectations based on the comparison of the set of expectations with the set of scenarios. Each expectation in the set of valid expectations is an expectation that matches with at least one scenario. Each expectation in the set of invalid expectations is an expectation that does not match with any scenario or matches with more than one scenarios. The validation unit is further configured to provide the set of valid expectations to the expectations storage for storing the same.

The arrange phase also encompasses the specification watcher [302] that monitors the specifications and identifies any changes or modifications in the set of specifications. The mechanism through which specification watcher [302] monitors changes in the set of specifications includes but is not limited to file watchers, call back mechanisms from the location where the specifications are stored, etc. In case any changes or modifications are detected by the specification watcher [302], it is configured to provide such updates to the specification parser [304]. In this situation, the specification parser [304] again parses the specification and provides updates to the scenario generator [104]. The scenario generator [104] then updates the scenarios generated earlier based on the updated specifications and stores these updated scenarios in the storage unit [108]. These updated scenarios are then used by the validation engine [308] to revalidate the set of expectations based on the updated set of scenarios. Consequently, the set of valid expectations and the set of invalid expectations are also updated by the validation engine [308] and provided again to the expectation storage [310]. Thus, the specification watcher [302] and the validation engine [308] together ensure that the set of expectations are always validated based on the latest set of scenarios generated by the scenario generator [104] based on the latest set of specifications. Thus the expectations are always in line with the latest version of the specification thereby avoiding the stale stub problem.

Now, referring to step 3, comprises the act phase, wherein an application is being tested. This application under test [326] may also be referred to as the application/system under test [326]. The application under test [326] may be an independent component that is part of a larger system [100] or a combination of several smaller components that run in a variety of environments including but not limited to handheld devices, servers, cloud instances, etc. Examples: mobile application, endpoint application, http services, messaging systems, storage systems like databases, etc.

In a first implementation, a feature/capability is exercised on the application under test [326] which in turn invokes the proxy server that is emulating the dependency through a synchronous protocol. For instance, the application under test [326] may send a HTTP request to the proxy server/ system [100]. In such a scenario, a request (such as an HTTP request) is received at the protocol server. The protocol server [110]/[112] herein is a pluggable unit. In this implementation, the request is received at the synchronous protocol server [110]. For example, say the request received is "GET/products/1".

The synchronous protocol server [110] is configured to provide and service this request to the scenario matcher [318]. The scenario matcher [318] is configured to match this request with the updated set of scenarios generated during the initialize/arrange phase and provide the result of such matching to the synchronous protocol server [110]. Continuing with the above example, the request "GET/ products/1" is matched with the updated set of scenarios. This request may match with the scenario S1: "GET/products/{integer 1 . . . 4}".

In case the request matches with any scenario from the updated set of scenarios, the synchronous protocol server [110] next retrieves the updated set of valid expectations from the expectation storage [310]. The synchronous protocol server [110] then matches or compares the request with the updated set of valid expectations. In case the request matches with any expectation from the updated set of valid expectations, the synchronous protocol server [110] generates a response based on the matching expectation. Continuing with the above example, the request "GET/products/ 1" is matched with the updated set of valid expectations. Say, for instance, the updated set of valid expectations are as follows:

| Expectation ID | Expectation |
|---|---|
| Ex1 | {<br>  "http-request": {<br>    "path": "/products/1",<br>    "method": "GET"<br>  },<br>  "http-response": {<br>    "status": 200,<br>    "body": {<br>      "name": "Mobile phone holder",<br>    },<br>    "status-text": "OK"<br>  }<br>} |
| Ex2 | {<br>  "http-request": {<br>    "path": "/products/2",<br>    "method": "GET"<br>  },<br>  "http-response": {<br>    "status": 200,<br>    "body": {<br>      "name": "Lamp",<br>    }, |

-continued

| Expectation ID | Expectation |
|---|---|
| |       "status-text": "OK"<br>    }<br>  } |

In this example, the request "GET/product/1" matches with the expectation EX1. The synchronous protocol server [110] thus generates the response "Mobile phone holder". The synchronous protocol server [110] is configured to provide this response back to the application under test [326]. The synchronous protocol server [110] is further configured to record or store this interaction in the interaction storage [320]. For instance, the interaction stored in the interaction storage [320] in this example is as follows:

```
Request: "GET/product/1"
Matching scenario: S1: "GET/products/ {integer 1...4}"
Matching expectation: EX1: {
            "http-request": {
                "path": "/products/1",
                "method": "GET"
            }
            "http-response": {
                "status": 200,
                "body": {
                    "name": "Mobile phone holder",
                },
                "status-text": "OK"
            }
        }
Generated Response / Response that was returned: {
                "status": 200,
                "body": {
                    "name": "Mobile phone holder",
                },
                "status-text": "OK"
            }
```

In a second implementation, a feature/capability is invoked on the application under test [326] which in turn invokes the proxy server that is emulating the dependency through asynchronous protocol. In this case, the application under test [326] may act as a publisher or a receiver.

In case the application under test [326] acts as a publisher, the act phase includes receiving at the asynchronous protocol server [112], a message from the application under test [326]. The asynchronous protocol server [112] is configured to provide this message to the scenario matcher [318]. The scenario matcher [318] is configured to match this message with the updated set of scenarios generated during the initialize/arrange phase and provide the result of such matching to the asynchronous protocol server [112].

In case the message matches with any scenario from the updated set of scenarios, the asynchronous protocol server [112] next retrieves the updated set of valid expectations from the expectation storage [310]. The asynchronous protocol server [112] then matches or compares the message with the updated set of valid expectations. In case the message matches with any expectation from the updated set of valid expectations, the asynchronous protocol server [112] acts on the actions that need to be performed on message reception including but not limited to those that are defined in the matching expectation.

The asynchronous protocol server [112] is further configured to record or store this interaction in the interaction storage [320]. For instance, the interaction stored may include the message received, the matching scenario, the matching expectation and the actions taken.

In case the application under test [326] acts as a receiver, an external dependency may exist owing to which the interaction between the application and the proxy server has to be initiated from the proxy server end. In this situation, a trigger may be received at the trigger receiver [314] to initiate the proxy server. This trigger may comprise an expectation identifier of a specific expectation that has been previously set during the arrange phase. For instance, say, the trigger receiver [314] receives a trigger with expectation id EX22. The trigger receiver [314] is configured to match the expectation identifier received in the trigger with the expectation identifiers of the updated set of valid expectations stored in the expectation storage [310]. Say, the set of valid expectations includes the expectations with identifiers EX21, EX22, EX23. In this example, the received expectation identifier EX22 matches with the identifier EX22 in the expectation storage [310].

The trigger receiver [314] then retrieves from the expectation storage [310], the expectation with an identifier that matches with the expectation identifier received in the trigger. Continuing with the above example, say, the expectation EX22 is as follows:

```
{
    "jms-message-to-send": {
        "channel": "deliveryNotifications",
        "payload": {
            "orderId": "123123",
            "status": "In Transit"
        }
    },
    "jms-message-on-send-actions": {
        "timeoutInSeconds": 360,
        "retry": 3
    }
}
```

This matching expectation is then provided by the trigger receiver [314] to the asynchronous protocol server [112]. The asynchronous protocol server [112] is then configured to identify the message associated with the matching expectation and provide such message to the application under test [326]. In this example, the asynchronous protocol server [112] will send a message comprising orderId, status to the application under test [326].

In case the expectation identifier in the trigger does not match with any expectation in the updated set of valid expectations stored in the expectation storage [310], then the trigger receiver [314] is configured to generate and send an error response to the device [324] for the trigger request and the application/system under test [326] may not receive any communication.

At the final stage of assert, an application response is asserted and based on the interaction in the preceding step for an expectation identifier, verification is done. The verification request is typically received from a device [324] where a user wants to check if an interaction has occurred in the past for a specific expectation and/or what interaction have occurred in the past for a specific expectation. The verification request comprises the matching detail, for which the user wishes to perform the verification.

A single expectation verification request comprising an expectation identifier may be as follows:

```
{
    "expectationId": EX31
}
```

In another example, a verification request comprising matching details may be as follows:

```
{
    "http-request" : {
        path: "/products/11"
    }
    "http-response": {
        "status": 200
    }
}
```

The verification unit [322] retrieves from the storage unit [108], one or more interactions associated with the matching detail in the received verification request. These retrieved one or more interactions are then transmitted back to the device [324] from which the verification request was received. These retrieved one or more interactions from the storage unit [108] represent the interactions that have occurred in the past for that specific one or more expectations for which the verification request was received.

In order to service the set of requests and/or the set of new requests as described above, the present invention encompasses identifying, by the processing unit [106], a set of protocols based on the set of specifications, wherein each protocol from the set of protocols is one of a synchronous architecture protocol and an asynchronous architecture protocol. For instance, if the Open API specification is received in the set of specifications, then the protocol identified by the processing unit [106], is a synchronous protocol. The invention further encompasses identifying. by the processing unit [106], a set of protocol servers based on the identified set of protocols, wherein each protocol server in the set of protocol servers is one of a synchronous protocol server [110] and an asynchronous protocol server [112]. In the above example, the protocol server identified by the processing unit [106], is the synchronous protocol server [110] as the synchronous protocol has been identified to be associated with the specification (Open API) received at the system [100]. This identification of the protocol and the protocol server based on the received specifications may be done when the set of specifications are received at the communication unit [102]. This is advantageous as the system [100] is able to service any requests coming in more quickly since the protocol server that has to service the request has already been identified and initialized by the processing unit [106].

In an event, it is identified that the set of new requests pertain to synchronous protocol, the set of new requests are sent by the communication unit [102] to the synchronous protocol server [110] for further processing. The processing of the request by the synchronous protocol server [110] has been explained below with reference to FIG. 4. In an event, it is identified that the set of new requests pertain to asynchronous protocol, the set of new requests are sent by the communication unit [102] to the asynchronous protocol server [112] for further processing. The processing of the request by the asynchronous protocol server [112] has been explained below with reference to FIG. 5.

Figure 4:
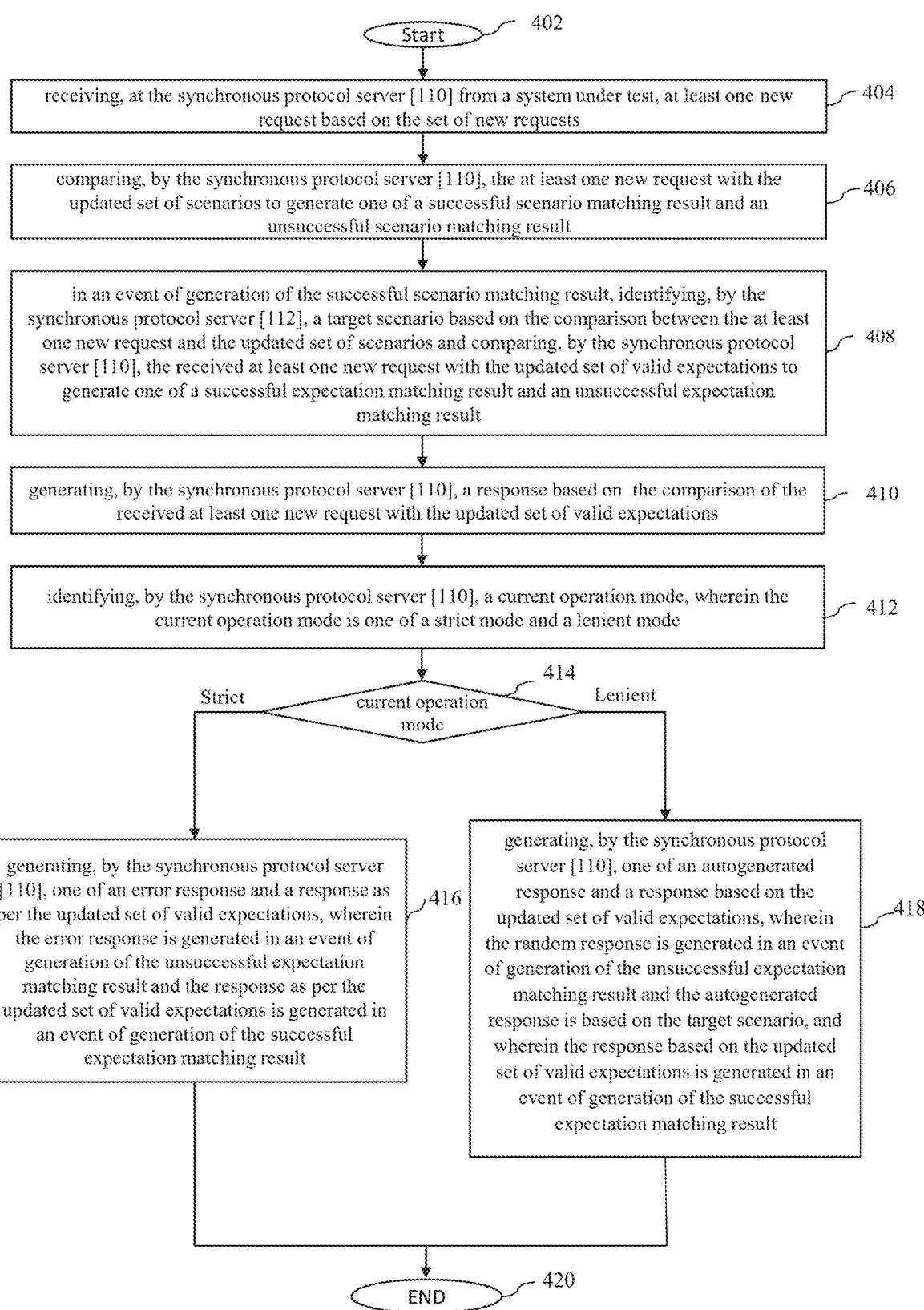
FIG. 4 illustrates a method of servicing requests pertaining to synchronous protocol implemented by a synchronous protocol server, in accordance with the exemplary embodiments of the present invention.

Referring to FIG. 4, that shows a method implemented by a synchronous protocol server [110] that represents the act phase, in accordance with the exemplary embodiments of the present invention. In an implementation, the method is performed by the system [100].

Based on the identification of the protocol server, the method flow for the synchronous protocol server [110] starts at step 402 and proceeds to 404.

At step 404, the method comprises receiving, at the synchronous protocol server [110] from a system under test [326], at least one new request based on the set of new requests. This new request is a request placed by a system under test [326]. And at step 406, the method comprises comparing by the synchronous protocol server [110], the at least one new request with the updated set of scenarios to generate one of a successful scenario matching result and an unsuccessful scenario matching result. At step 408 scenario matching is done, in an event of generation of the successful scenario matching result the method encompasses identifying by the synchronous protocol server [110], a target scenario based on the comparison between the at least one new request and the updated set of scenarios.

The method encompasses generating, by the synchronous protocol server [110], a scenario matching error response in an event of generation of an unsuccessful scenario matching result. Thus, if the received request does not match with any of the scenarios, an error response is generated and the method ends.

At step 408, in an event of generation of the successful scenario matching result, the method comprises identifying, by the synchronous protocol server [110], a target scenario based on the comparison between the at least one new request and the updated set of scenarios; and comparing by the synchronous protocol server [110], the received at least one new request with the updated set of valid expectations to generate one of a successful expectation matching result and an unsuccessful expectation matching result. A successful expectation matching result is generated when the received at least one new request matches with an expectation from the updated set of valid expectations. An unsuccessful expectation matching result is generated when the received at least one new request does not match with any expectation from the updated set of valid expectations. Thus, if the received new request matches with any scenario from the updated set of scenarios, then the invention encompasses checking if the received request matches with any expectation from the updated set of valid expectations.

Continuing with the above example,

New Request R1: GET/products/1 matches with the scenario S1. The received new request R1 is now matched with the updated set of valid expectations EX1, EX2, EX3 and EX4 and thereby, matches with the expectation EX1.

Further, at step 410, the method incorporates generating, by the synchronous protocol server [110], a response based on the comparison of the received at least one new request with the updated set of valid expectations.

Next at step 412, the method encompasses identifying, by the synchronous protocol server [110] a current operation mode, wherein the current operation mode is one of a strict mode and a lenient mode. In an implementation, when the system [100] operates in a strict mode, the system [100] generates responses for only those requests for which an expectation has been set. For any other requests, i.e., for any request for which an expectation has not been set even if the request is as per the specification (matches with the one and only one scenario), the system [100] generates an error response. In another implementation, when the system [100] operates in lenient mode, the system [100] generates response for all types of requests by the system under test

[326] as long as the request is as per the specification (matches with one and only scenario). In the lenient mode, response for a request for which expectation has been set, is generated as per the set expectation; and response for a request for which no expectation has been set, is autogenerated by providing a random value in line with the data type and format as per the scenario with which the request matches. Step 414 encompasses identifying the current operation mode. In case the current operation mode is determined to be strict mode, the method proceeds to step 416 and in case the current operation mode is determined to be lenient mode, the method proceeds to step 418.

At step 416, in an event the current operation mode is a strict mode, the method encompasses generating, by the synchronous protocol server [110], one of an error response and a response as per the updated set of valid expectations. The error response is generated in an event of generation of the unsuccessful expectation matching result and the response as per the updated set of valid expectations is generated in an event of generation of the successful expectation matching result. Thus, if the received at least one new request matches with a scenario (from the updated set of scenarios) and also matches with an expectation (from the updated set of valid expectations), a response as per the updated set of valid expectations is generated. For instance, if the new request R1 matches with scenario S1 and valid expectation EX1, then the response generated by the synchronous protocol server [110] is the response as per the valid expectation EX1. Similarly, if the received at least one new request does not match with a scenario (from the updated set of scenarios) or does not match with an expectation (from the updated set of valid expectations), an error response is generated by the synchronous protocol server [110]. For instance, if the new request R1 matches with scenario S1 but does not match with any expectation (from the updated set of valid expectations), then an error response is generated by the synchronous protocol server [110].

At step 418, in an event the current operation mode is the lenient mode, the method encompasses generating by the synchronous protocol server [110], one of an autogenerated response and a response based on the updated set of valid expectations. The autogenerated response is generated in an event of generation of the unsuccessful expectation matching result, and the response based on the updated set of valid expectations is generated in an event of generation of the successful expectation matching result. The autogenerated response generated by the synchronous protocol server [110] is based on the comparison between the at least one new request and the updated set of scenarios. For instance, say a new request R1 matches with the scenario S1, but the request R1 does not match with any expectation from the set of valid expectations. In this situation, the synchronous protocol server [110] generates an autogenerated response based on the scenario S1. Similarly, if the received at least one new request matches with a scenario (from the updated set of scenarios) and also matches with an expectation (from the updated set of valid expectations), a response as per the updated set of valid expectations is generated. For instance, if the new request R1 matches with scenario S1 and valid expectation EX1, then the response generated by the synchronous protocol server [110] is the response as per the valid expectation EX1. The method terminates at step 420.

Now referring to FIG. 5, that shows a method implemented by an asynchronous protocol server [112] that represents the act phase, in accordance with the exemplary embodiments of the present invention. In an implementation, the method is performed by the system [100]. The method flow of an asynchronous protocol server [112] starts at step 502 and proceeds to 504.

At step 504, the method encompasses receiving at the asynchronous protocol server [112] at least one message based on the set of new requests, where the message is composed by a header (metadata such as identification) and a body and is usually sent through asynchronous protocols like AMQP that are obvious to a person skilled in the art. Then at step 506, the method includes comparing by the asynchronous protocol server [112], the received at least one message with the updated set of scenarios to generate one of the successful scenario matching result and the unsuccessful scenario matching result. The scenario matching by the asynchronous protocol server [112] is done. A successful scenario matching result is generated when the received at least one message matches with a scenario from the set of updated scenarios. An unsuccessful scenario matching result is generated when the received at least one message does not match with a scenario from the set of updated scenarios or matches with more than one scenario from the set of updated scenarios. If the successful scenario matching result is generated, the method proceeds to step 508

In an event of generation of the scenario matching unsuccessful result, the method includes generating an error message by the asynchronous protocol server [112]. Thus, if the received message does not match with any scenario from the updated set of scenarios, then an error message is generated.

In an event of generation of the scenario matching successful result at step 506, the method proceeds to step 508 includes identifying by the asynchronous protocol server [112], a target scenario based on the comparison of the received at least one message with the updated set of scenarios. Thereafter, the at least one message is compared with the updated set of valid expectations to generate one of a successful expectation matching result and an unsuccessful expectation matching result. Thus, if the received message matches with any scenario from the updated set of scenarios, then the invention encompasses checking if the received message matches with any expectation from the updated set of valid expectations.

Next, step 510, encompasses identifying, by the asynchronous protocol server [112], a target expectation based on the comparison of the received at least one message with the updated set of valid expectations. The target expectation is that expectation that matches with the received message. The received at least one message, the target scenario and the target expectation are also stored by the asynchronous protocol server [112] at the storage unit [108] at step 512. The method ends at step 514.

Figure 6A:
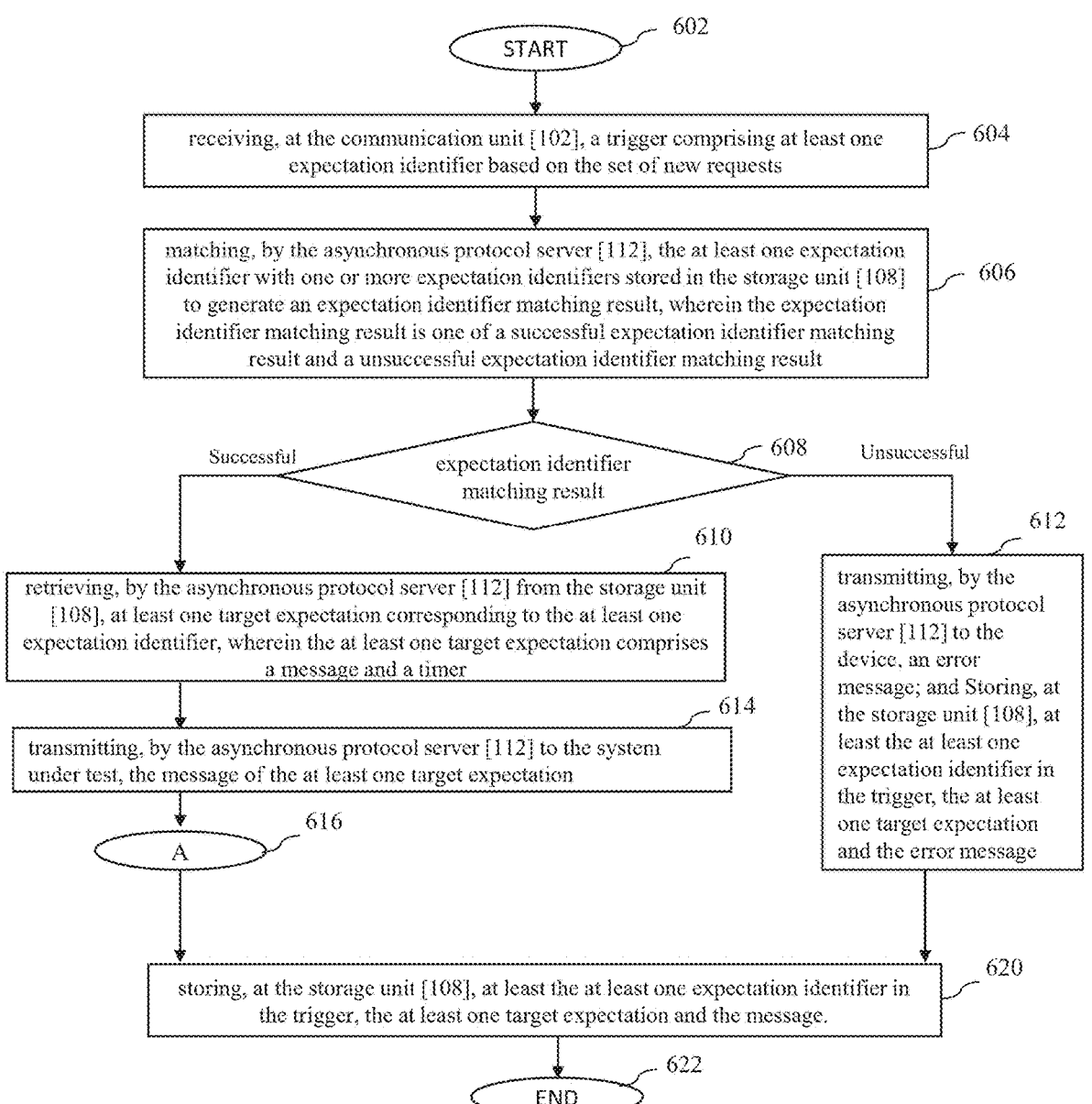

Now, referring to FIGS. 6A and 6B, for an asynchronous protocol server [112]. The method begins at step 602 and proceeds to step 604. At step 604, the method includes receiving at the communication unit [102], a trigger comprising at least one expectation identifier based on the set of new requests. The trigger is a unit or module that is part of the system [100]. Furthermore, step 606 includes matching by the asynchronous protocol server [112], the at least one expectation identifier with the one or more expectation identifiers stored in the storage unit [108] to generate an expectation identifier matching result, wherein the expectation identifier matching result is one of a successful expectation identifier matching result and an unsuccessful expectation identifier matching result. At step 608, expectation identifier matching result is determined. A successful expectation identifier matching result is generated when a received expectation identifier matches with the stored expectation identifiers. An unsuccessful expectation identifier matching result is when a received expectation identifier does not match with the stored expectation identifiers. In case of the successful expectation identifier matching result, the method proceeds to 610 and in case of an unsuccessful expectation identifier matching result, the method proceeds to 612.

In an event of generation of the unsuccessful expectation identifier matching result the method proceeds to step 612. The method includes transmitting by the asynchronous protocol server [112] to the device, an error message. Thus, if the expectation identifier received in the trigger does not match with any expectation identifier stored in the storage unit [108], an error response is generated by the asynchronous protocol server [112].

However, in an event of generation of the successful expectation identifier matching result, the method proceeds to step 610. At step 610 the method comprises: retrieving, by the asynchronous protocol server [112] from the storage unit [108] at least one target expectation corresponding to the at least one expectation identifier, wherein the at least target expectation comprises a message and a timer. The target expectation is that expectation whose expectation identifier matches with the expectation identifier received in the trigger. At step 614, the method encompasses transmitting by the asynchronous protocol server [112] to the system under test [326], the message of the at least one target expectation. Thus, if the expectation identifier of the received at matches with any expectation identifier stored in the storage unit [108], then the invention encompasses identifying that expectation and then transmitting the message of such expectation. Further, at step 620 the method encompasses storing at the storage unit [108], at least the one expectation identifier in the trigger, the at least one target expectation and the message.

Furthermore, the method proceeds from step 616 to step 624, the method comprising recording by the asynchronous protocol server [112], a time of transmission of the message. Thereafter, at step 626, the method encompasses starting by the asynchronous protocol server [112], a timer, wherein the timer is configured to expire at the end of the timeout duration. Thereafter, the method encompasses determining by the asynchronous protocol server [112], a status of delivery (at step 628) of the message based at least on the time of transmission of the message and the timeout duration.

In an implementation, if the asynchronous protocol being used by the asynchronous protocol server [112] supports an acknowledgement mechanism, then determination of the status of delivery of the message includes identification one of:

1. A first event comprising a receipt of an acknowledgement prior to an expiry of the timer, and
2. A second event comprising an expiry of the timer and an acknowledgement is not received prior to an expiry of the timer.

In an implementation, identifying by the asynchronous protocol server [112] a third event comprising a receipt of an acknowledgement subsequent to an expiry of the timer.

Acknowledgement includes receipt of an acknowledgement signal from the System under test [326] by means of message but the disclosure is not limited to this and may incorporate other acknowledgement mechanisms.

In this implementation, determining by the asynchronous protocol server [112], a status of delivery of the message based on the identification of one of the first event and, the second event, wherein the determined status of delivery of the message is one of a successful status and an unsuccessful status, and wherein the determined status is the successful status in an event of identification of the first event and the determined status is the unsuccessful status in an event of identification of the second event. Subsequently, at step 630, storing at the storage unit [108], the determined status of delivery of the message.

A successful status is obtained when the acknowledgement is received is well within the set timer. An unsuccessful status is obtained when the acknowledgement is not received within the set timer.

In another implementation, if the asynchronous protocol being used by the asynchronous protocol server [112] does not support an acknowledgement mechanism, then determination of the status of delivery of the message includes identification of one of:

1. A fourth event comprising transmission of the message prior to the expiry of the timer; and
2. A fifth event comprising expiry of the timer prior to the transmission of the message.

In this implementation, determining by the asynchronous protocol server [112] a status of delivery of the message based on the identification of one of the fourth event and the fifth event, wherein the determined status of delivery of the message is one of a successful status and an unsuccessful status. The determined status is the successful status in an event of identification of the fourth event and the determined status is the unsuccessful status in an event of identification of the fifth event, and subsequently, storing by asynchronous protocol server [112] at the storage unit [108], the determined status of delivery of the message (step 630).

A successful status is obtained when the time of transmission of the message is well within the set timer. An unsuccessful status is obtained when the time of transmission is not within the set timer.

Next, at step 620 storing, by the asynchronous protocol server [112] at the storage unit [108], the at least one expectation identifier in the trigger, the at least one target expectation and the message. The method terminates at step 622.

Figure 7:
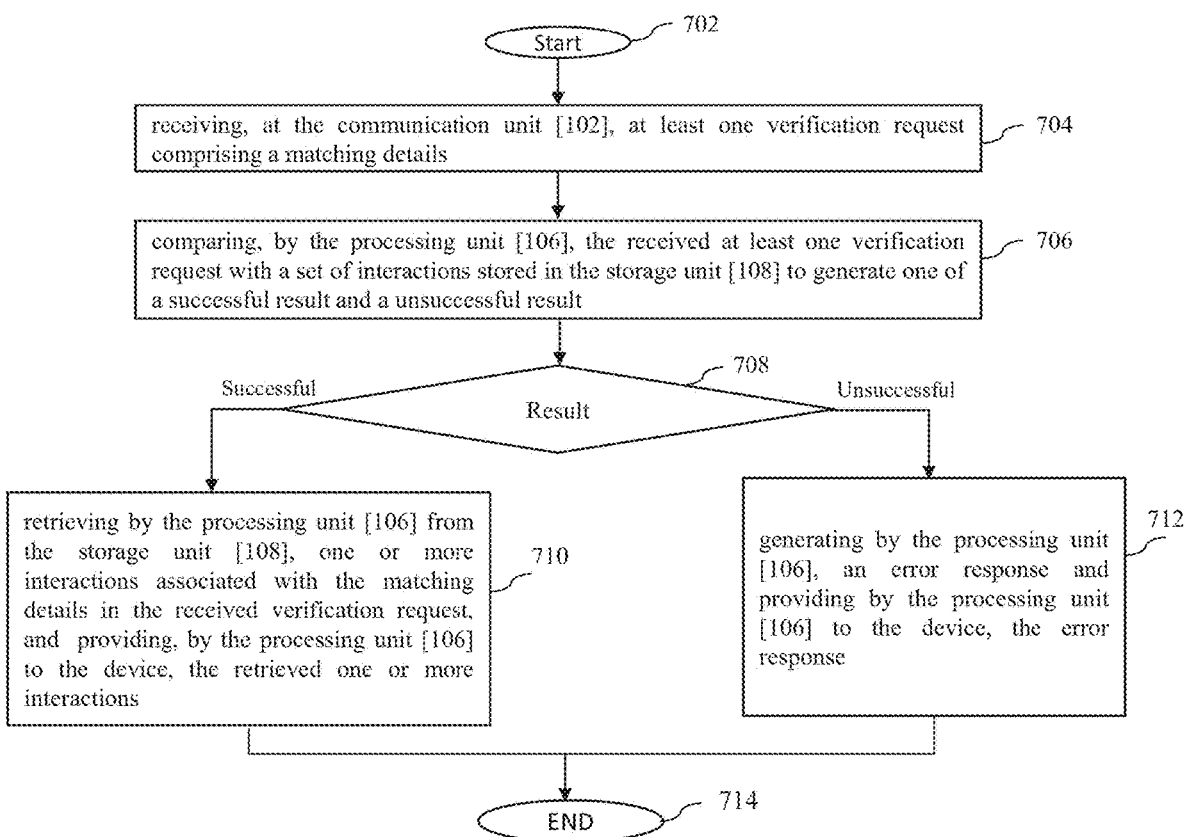
FIG. 7 illustrates an exemplary situation for implementation of verification of requests by the system of the present invention are implemented, in accordance with the exemplary embodiments of the present invention.

Now referring to FIG. 7 which describes an exemplary situation for implementation of verification of requests by the system [100], of the present invention. The method begins at step 702 and proceeds to step 704. At step 704, the method comprises receiving, at the communication unit [102], at least one verification request comprising a matching detail. The at least one verification request may comprise a target sequence of expectation. Examples:

In one example, the verification request may comprise an expectation identifier such as:

```
{
  "expectationId": EX31
}
```

In another example, the verification request may include a set of expectations with given expectationIds when the user wishes to verify if the expectations in the sequence were exercised in the exact order.

```
{
  "sequence": [EX31, EX36, EX6, EZ10, EM13]
}
```

In yet another example, the verification request may include scenario matching details, such as:

```
{
  "http-request" : {
    path: "/products/11"
  }
  "http-response": {
    "status": 200
  }
}
```

In yet another example, the verification request may include a set of expectations were exercised in the exact order where the sequence of expectations include both expectations for synchronous and asynchronous operations.

```
{
  "sequence": [
    {"http-request" : {path: "/products/11"}, "http-response": {"status": 200}},
    {"channel" : "orders", "payloadToSend": {"priority": "standard"}},
    {"channel" : "dispatch", "payloadToReceive": {"orderId": "10"}},
    {"http-request" : {path: "/orders/10"}, "http-response": {"status": 200}},
  ]
}
```

The verification request is typically received from a device where a user wants to check if an interaction has occurred in the past for a specific expectation and/or what interaction has occurred in the past for a specific expectation. The verification request thus comprises one of the expectation identifier and the matching scenario detail of the expectation but the disclosure is not limited thereto for which the user wishes to perform the verification.

Further, at step 706 the method comprises comparing, by the processing unit [106], the received at least one verification request with a set of interactions stored in the storage unit [108] to generate one of a successful result and an unsuccessful result. At step 708, the verification result may be determined, in case of a successful result the method proceeds to step 710 and an unsuccessful result leads to step 712. Now, at step 710 in an event of generation of the successful result, the method includes retrieving by the processing unit [106] from the storage unit [108], one or more interactions associated with the matching details in the received verification request, and providing, by the processing unit [106] to the device, the retrieved one or more interactions. For instance, if the verification request comprises expectation identifier id1, the processing unit [106] matches id1 with the expectation identifiers stored in the storage unit [108]. If the expectation identifier id1 matches with an expectation identifier stored in the storage unit [108], then the interactions associated with the expectation identifier id1 are retrieved and provided to the device. Furthermore, at step 712, in an event of generation of the unsuccessful result, the method includes generating by the processing unit [106], an error response and providing by the processing unit [106] to the device, the error response. For instance, if the verification request comprises expectation identifier id1, the processing unit [106] matches/compares id1 with the expectation identifiers stored in the storage unit [108]. If the expectation identifier id1 does not match with an expectation identifier stored in the storage unit [108], then an error message is generated and provided to the device.

For example, if the verification request received is as follows:

```
{
    "expectationId": EX31
}
```

Then, all interactions pertaining to expectation identifier EX31 is retrieved from the storage unit [108].

The method terminates at 714.

FIGS. 8A, 8B and 8C illustrates a proxy server coverage report, in accordance with the exemplary embodiment of the present invention.

FIG. 8A depicts the overall coverage report that enlists multiple specifications such as "product.yaml" and "order-dispatch.yaml", the total number of elements in each specification, the missed elements for each specification and the coverage percentage for each specification. Data elements represent leaf-level data components of the specification. For instance, this report shows that the specification "product.yaml" has a coverage of 72%, i.e., 72% of the data elements in the specification have been exercised as part of the interaction between an application/system under Lest [326] and the proxy server/system [100].

In an example, say that the specification includes the following:

```
product {
    productId: number
    productName: string
    category(optional): string
    inStock(optional): boolean
    models: {
        name(optional):
            :
    }
}
```

The data elements in the above specification are: productId, productName, category, inStock, and model name.

In this example, say the expectation set by the user via a device is as follows:

```
/products/{productId}
    GET
        200 OK - EX1 (productId =1, productName: book)
        404 Not Found - No expectation - EX2 (productId =2, error)
            {errorMessage - string , errorCode -number}
```

Continuing the above example, say the requests serviced by the system [100] while servicing an application X is as follows:

GET/products/1

In this example, the interaction storage at the system [100] includes the following interaction:

Request: /products/1

Response: productId, product name

In this example, the data element productId, productName was exercised, however, the other data elements, i.e., category, inStock, and model name were not serviced. Thus, the coverage report in this example would indicate a coverage of 40% as only 40% of the data elements have been exercised.

Now, the API coverage drill down report in figure SB, illustrates a detailed report on the coverage of the specification "product.yaml". Similarly, FIG. 8C depicts a detailed report on the coverage of the specification "order-dispatch.yaml".

Each time a request is serviced by the system [100], the corresponding interaction is stored (including the request and response, or message and action, etc.) at the interaction storage. These interactions stored in the interaction storage are used to prepare the coverage reports shown herein. The total coverage gives a user a critical context on the previous executions stored in the interaction storage when diagnosing a test. It will be appreciated by those skilled in the art that the coverage reports shown in FIGS. 8A, 8B and 8C are only exemplary and any other format of coverage reports are also encompassed by the present disclosure.

As is evident from the disclosure of the embodiments of the present invention, the solution provided by the present disclosure evinces significant technical advancement and advantages over known solutions. The embodiments of the present disclosure provide a system [100]/proxy server that can simultaneously emulate several specifications which may include a mix of specification standards (including versions), protocols and technology stacks. For instance, the proxy server can simultaneously emulate behaviors for a mix of specifications including but not limited to OpenAPI 3.0, OpenAPI 3.1, WSDL SOAP, AsyncAPI, Kafka, JMS, etc. Further, the solution provided by the present disclosure is able to verify an interaction sequence that spans all these specifications.

The solution provided by the present disclosure has numerous applications and use cases, including, but not limited to the following:

1. Stubbing—A team that is building a multi-modal courier service and is pitching to investors about a seamless flow. To build this application it may take several months to integrate with the APIs of freight partners, payment gateways, etc. at both a technical level and the paperwork etc. However they do have the API specifications from their partners, so they can quickly spin up a proxy server using the solution of the present disclosure with those API specifications and only build their user interface and demonstrate the flow to secure the funding.

2. Sandbox on the cloud—XYZ company is a large banking services provider. They are now opening their services to partners through their APIs. To help their partners quickly get a sense of how the APIs will behave, they can host dedicated proxy servers using the solution of the present disclosure for each vendor which is based on their API specifications. This way their partners can leverage the proxy server as a reference to quickly verify their integration and start building products on top of it.

3. Service virtualization with Fault simulation—ABC company has a lot of partner applications that at times can suffer availability issues. They intend to make their own product offerings resilient to these issues. In their non-functional testing environment where they have all their internal components deployed they leverage proxy servers using the solution of the present disclosure to emulate their external dependencies based on the API specifications of those services. They are then able to simulate faults in their partner systems by setting these up as part of the expectations. Examples:
    Slow response times from partner system based on specific patterns in request
    One in ten requests time out for an endpoint
    Return specific errors codes at certain time of day In an exemplary implementation, say, there is an e-commerce application that a user is developing. This application has connections with multiple APIs, say, a social media application API, a maps application API and an internal API of the e-commerce application. Using the features of the present disclosure, the user in this case can stub the social media application API, the maps application API, etc. using the proxy server/system [100]. In this example, the API specifications that are leveraged in the proxy server belong to the social media application and the maps application which the proxy server will be emulating. The proxy server generates a set of scenarios based on these API specifications. Further, the user can dynamically set up expectations on the proxy server in relation to the functionality of the e-commerce application that interacts with social media application API, maps application API etc. For instance, the user may set up an expectation that when a user clicks on a "detect address" button in the e-commerce application to setup a delivery, a function is invoked. This function should include the current location latitude and longitude as parameters that are passed from the e-commerce application (request). The expectation set is that when such a request is received with a given latitude and longitude, the proxy server emulating maps application API should return the address information. Once the expectation is set, the proxy server validates the expectation with the set of scenarios generated from the specification of the maps application API. If the expectation matches with a scenario, it is considered a valid expectation and is stored in the expectation storage [310]. During testing, when the user clicks on the "detect address" button on the e-commerce application, a request comprising the latitude and longitude is sent to the proxy server (that is emulating the maps application API). The proxy server compares this request with the set of scenarios generated from the specification of the maps application API. If the request matches with a scenario, the proxy server next validates the request based on the stored valid expectations. If the request also matches with a valid expectation, then a response as per the matching valid expectation, i.e. the address in this example, is returned to the system under test [326]. In this manner, using the features of the present disclosure, the user is able to set expectations that are validated and an appropriate response is sent by the proxy server.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for validating a set of expectations based on a set of specifications, the method comprising:
   receiving, at a communication unit, the set of specifications;
   generating, by a scenario generator, a set of scenarios based on the received set of specifications;
   dynamically receiving, at the communication unit, the set of expectations;
   comparing, by a processing unit, the set of expectations with the set of scenarios;
   identifying, by the processing unit, a set of valid expectations and a set of invalid expectations from the set of expectations based on the comparison between the set of expectations and the set of scenarios;

storing, at a storage unit, the set of valid expectations and the set of scenarios;
   receiving, at the communication unit, a set of requests;
   servicing, by the processing unit, the set of requests based at least on the set of valid expectations and the set of scenarios;
while servicing the set of requests, simultaneously performing:
   continuously and dynamically monitoring, by the processing unit, the set of specifications to identify one or more changes in at least one specification from the set of specifications;
   dynamically updating, by the scenario generator, the set of scenarios to generate an updated set of scenarios based on the identified changes in the at least one specification;
   comparing, by the processing unit, the set of expectations with the updated set of scenarios;
   dynamically identifying, by the processing unit, an updated set of valid expectations based on the comparison between the set of expectations and the updated set of scenarios; and
   storing, at the storage unit, the updated set of valid expectations and the updated set of scenarios;
   receiving, at the communication unit, a set of new requests; and
   servicing, by the processing unit, the set of new requests based at least on the updated set of valid expectations and the updated set of scenarios.

2. The method as claimed in claim 1, wherein each scenario from the set of scenarios and each scenario from the updated set of scenarios, comprises a version number and a scenario content.

3. The method as claimed in claim 2, wherein
   servicing, by the processing unit, the set of requests is further based on the version number and the scenario content of one or more scenarios from the set of scenarios, and
   servicing, by the processing unit, the set of new requests is further based on the version number and the scenario content of one or more scenarios from the set of updated scenarios.

4. The method as claimed in claim 1, wherein
   in an event the set of specifications comprises a plurality of specifications, the generating, by the scenario generator, the set of scenarios further comprises generating a subset of scenarios for each specification from the plurality of specifications,
   in an event the set of requests comprises a plurality of requests, the servicing, by the processing unit, the set of requests, further comprises simultaneously servicing the plurality of requests based on the subset of scenarios for each specification from the plurality of specifications,
   in an event the set of specifications comprises a plurality of specifications, the generating, by the scenario generator, the updated set of scenarios comprises generating an updated subset of scenarios for each specification from the plurality of specifications, and
   in an event the set of new requests comprises a plurality of new requests, the servicing, by the processing unit, the set of new requests, further comprises servicing the plurality of new requests simultaneously based on the updated subset of scenarios for each specification from the plurality of specifications.

5. The method as claimed in claim 1, further comprises:

identifying, by the processing unit, a set of protocols based on the set of specifications, wherein each protocol from the set of protocols is one of a synchronous architecture protocol and an asynchronous architecture protocol; and identifying, by the processing unit, a set of protocol servers based on the identified set of protocols, wherein each protocol server in the set of protocol servers is one of a synchronous protocol server and an asynchronous protocol server.

6. The method as claimed in claim 5, wherein the servicing, by the processing unit, the set of new requests further comprises:

receiving, at the synchronous protocol server, at least one new request based on the set of new requests;

comparing, by the synchronous protocol server, the at least one new request with the updated set of scenarios to generate one of a successful scenario matching result and an unsuccessful scenario matching result;

in an event of generation of the successful scenario matching result, identifying, by the synchronous protocol server, a target scenario based on the comparison between the at least one new request and the updated set of scenarios and comparing, by the synchronous protocol server, the received at least one new request with the updated set of valid expectations to generate one of a successful expectation matching result and an unsuccessful expectation matching result; and generating, by the synchronous protocol server, a response based on the comparison of the received at least one new request with the updated set of valid expectations.

7. The method as claimed in claim 6, wherein generating the response, by the synchronous protocol server, based on the comparison between the received at least one new request and the updated set of valid expectations further comprises: identifying, by the synchronous protocol server, a current operation mode, wherein the current operation mode is one of a strict mode and a lenient mode.

8. The method as claimed in claim 7, wherein in an event the current operation mode is the strict mode, generating, by the synchronous protocol server, one of an error response and a response as per the updated set of valid expectations, wherein the error response is generated in an event of generation of the unsuccessful expectation matching result and the response as per the updated set of valid expectations is generated in an event of generation of the successful expectation matching result.

9. The method as claimed in claim 7, wherein in an event the current operation mode is the lenient mode, generating, by the synchronous protocol server, one of an autogenerated response and a response based on the updated set of valid expectations, wherein the autogenerated response is generated in an event of generation of the unsuccessful expectation matching result and the autogenerated response is based on the target scenario, and wherein the response based on the updated set of valid expectations is generated in an event of generation of the successful expectation matching result.

10. The method as claimed in claim 5, wherein the servicing, by the processing unit, the set of new requests further comprises:

receiving, at the asynchronous protocol server, at least one message based on the set of new requests;

comparing, by the asynchronous protocol server, the received at least one message with the updated set of scenarios to generate one of the successful scenario matching result and the unsuccessful scenario matching result;

in an event of generation of the successful scenario matching result, identifying, by the asynchronous protocol server, a target scenario based on the comparison of the received at least one message with the updated set of scenarios and comparing, by the asynchronous protocol server, the received at least one message with the updated set of valid expectations to generate one of the successful expectation matching result and the unsuccessful expectation matching result; and in an event of generation of the successful expectation matching result, identifying, by the asynchronous protocol server, a target expectation based on the comparison of the received at least one message with the updated set of valid expectations, and storing, by the asynchronous protocol server at the storage unit, at least the received at least one message, the target scenario and the target expectation.

11. The method as claimed in claim 5, wherein the servicing, by the processing unit, the set of new requests, further comprises:

receiving, at the communication unit, a trigger comprising at least one expectation identifier based on the set of new requests;

matching by the asynchronous protocol server, the at least one expectation identifier with one or more expectation identifiers stored in the storage unit to generate an expectation identifier matching result, wherein the expectation identifier matching result is one of a successful expectation identifier matching result and a unsuccessful expectation identifier matching result;

in an event of generation of the successful expectation identifier matching result, retrieving, by the asynchronous protocol server from the storage unit, at least one target expectation corresponding to the at least one expectation identifier, wherein the at least one target expectation comprises a message and a timer, and transmitting, by the asynchronous protocol server to the device, the message of the at least one expectation; and in an event of generation of the unsuccessful expectation identifier matching result, transmitting, by the asynchronous protocol server to the device, an error message, and storing, at the storage unit, at least one expectation identifier in the trigger, the at least one target expectation and the error message.

12. The method as claimed in claim 11, further comprising:

recording, by the asynchronous protocol server, a time of transmission of the message;

starting, by the asynchronous protocol server, a timer, wherein the timer is configured to expire at the end of a timeout duration;

determining, by the asynchronous protocol server, a status of delivery of the message based at least on the time of transmission of the message and the timeout duration; and storing, by the asynchronous protocol server at the storage unit, the determined status of delivery of the message.

13. The method as claimed in claim 1, wherein the set of expectations comprises a sequence comprising a plurality of transient expectations in an order, the comparing, by the processing unit, the set of expectations with the updated set of scenarios further comprises:

comparing, in the order, each transient expectation in the sequence with each scenario from the updated set of scenarios; and validating the sequence based on the comparison to generate a sequence validation result, wherein the sequence validation result is one of a successful result and an unsuccessful result, wherein the sequence validation result is the successful result in an event each expectation in the sequence matches with a scenario from the updated set of scenarios, and the sequence validation result is the unsuccessful result in an event at least one expectation in the sequence does not match with a scenario from the updated set of scenarios.

14. The method as claimed in claim 1, further comprising:

receiving, at the communication unit, at least one verification request comprising a matching details;

comparing, by the processing unit, the received at least one verification request with a set of interactions stored in the storage unit to generate one of a successful result and a unsuccessful result;

In an event of generation of the successful result, retrieving by the processing unit from the storage unit, one or more interactions associated with the matching details in the received verification request, and providing, by the processing unit to the device, the retrieved one or more interactions; and In an event of generation of the unsuccessful result, generating by the processing unit, an error response and providing by the processing unit to the device, the error response.

15. The method as claimed in claim 1, further comprising:

generating, by the processing unit, a coverage report based at least on the set of specifications and a set of interactions stored in the storage unit.

16. A system to validate a set of expectations based on a set of specifications, the system comprising:

at least one processor; and a memory storing instructions;

wherein the at least one processor is programmed to cooperate with the instructions to perform operations comprising:

receive the set of specifications, dynamically receive the set of expectations;

receive a set of requests;

receive a set of new requests;

generate a set of scenarios based on the received set of specifications;

compare the set of expectations with the set of scenarios;

identify a set of valid expectations and a set of invalid expectations from the set of expectations based on the comparison between the set of expectations and the set of scenarios;

the memory connected to the at least one processor, wherein the memory stores the set of valid expectations and the set of scenarios;

wherein the at least one processor is further configured to service, the set of requests based at least on the set of valid expectations and the set of scenarios, while servicing the set of requests, simultaneously performing:

continuously and dynamically monitor the set of specifications to identify one or more changes in the at least one specification from the set of specifications, dynamically update the set of scenarios to generate an updated set of scenarios based on the identified changes in the at least one specification, compare the set of expectations with the updated set of scenarios, and dynamically identify, an updated set of valid expectations based on the comparison between the set of expectations and the updated set of scenarios, wherein the memory is further configured to store the updated set of valid expectations and the updated set of scenarios, and wherein the at least one processor is further configured to service the set of new requests based at least on the updated set of valid expectations and the updated set of scenarios.

17. The system as claimed in claim 16, wherein each scenario from the set of scenarios and each scenario from the updated set of scenarios, comprises a version number and a scenario content.

18. The system as claimed in claim 17, wherein the at least one processor is further configured to:

service the set of requests based on the version number and the scenario content of one or more scenarios from the set of scenarios, and service, the set of new requests based on the version number and the scenario content of one or more scenarios from the set of updated scenarios.

19. The system as claimed in claim 16, wherein in an event the set of specifications comprises a plurality of specifications, the at least one processor is further configured to generate, the set of scenarios further comprises a subset of scenarios for each specification from the plurality of specifications, in an event the set of requests comprises a plurality of requests, the at least one processor is further configured to service the set of requests further comprises simultaneously service the plurality of requests based on the subset of scenarios for each specification from the plurality of specifications, in an event the set of specifications comprises a plurality of specifications, the at least one processor is further configured to generate the updated set of scenarios comprises to generate an updated subset of scenarios for each specification from the plurality of specifications, and in an event the set of new requests comprises a plurality of new requests, the at least one processor is further configured to service the set of new requests further comprises to service the plurality of new requests simultaneously based on the updated subset of scenarios for each specification from the plurality of specifications.

20. The system as claimed in claim 16, wherein the at least one processor is further configured to:

identify a set of protocols based on the set of specifications, wherein each protocol from the set of protocols is one of a synchronous architecture protocol and an asynchronous architecture protocol; and identify a set of protocol servers based on the identified set of protocols, wherein each protocol server in the set of protocol servers is one of a synchronous protocol server and an asynchronous protocol server.

21. The system as claimed in claim 20, wherein the at least one processor is configured to service the set of new requests via the synchronous protocol server, wherein the synchronous protocol server is configured to:

receive at least one new request based on the set of new requests;

compare the at least one new request with the updated set of scenarios to generate one of a successful scenario matching result and an unsuccessful scenario matching result;

identify in an event of generation of the successful scenario matching result, a target scenario based on the comparison the received at least one new request with the updated set of valid expectations to generate one of a successful expectation matching result and an unsuccessful expectation matching result; and generate a response based on the comparison of the received at least one new request with and the updated set of valid expectations.

22. The system as claimed in claim 21, wherein the synchronous protocol server is further configured to: identify a current operation mode, wherein the current operation mode is one of a strict mode and a lenient mode.

23. The system as claimed in claim 22, wherein in an event the current operation mode is the strict mode, the synchronous protocol server is further configured to generate one of an error response and a response as per the updated set of valid expectations, wherein the error response is generated in an event of generation of the unsuccessful expectation matching result and the response as per the updated set of valid expectations is generated in an event of generation of the successful expectation matching result.

24. The system as claimed in claim 22, wherein in an event the current operation mode is the lenient mode, the synchronous protocol server is further configured to generate one of an autogenerated response and a response based on the updated set of valid expectations, wherein the autogenerated response is generated in an event of generation of the unsuccessful expectation matching result, and the autogenerated response is based on the target scenario, and wherein the response based on the updated set of valid expectations is generated in an event of generation of the successful expectation matching result.

25. The system as claimed in claim 20, wherein to service the set of new requests, the asynchronous protocol server is further configured to:

receive, at least one message based on the set of new requests;

compare the received at least one message with the updated set of scenarios to generate one of the successful scenario matching result and the unsuccessful scenario matching result;

in an event of generation of the successful scenario matching result, identify a target scenario based on the comparison of the received at least one message with the updated set of scenarios and compare the received at least one message with the updated set of valid expectations to generate one of the successful expectation matching result and the unsuccessful expectation matching result; and in an event of generation of the successful expectation matching result, identify, a target expectation based on the comparison of the received at least one message with the updated set of valid expectations, and store at the memory, the received at least the received one message, the target scenario and the target expectation.

26. The system as claimed in claim 20, to service the set of new requests, the asynchronous protocol server is further configured to:

receive a trigger comprising at least one expectation identifier based on the set of new requests;

match the at least one expectation identifier with one or more expectation identifiers stored in the memory to generate an expectation identifier matching result, wherein the expectation identifier matching result is one of a successful expectation identifier matching result and a unsuccessful expectation identifier matching result;

in an event of generation of the successful expectation identifier matching result, retrieve from the memory, at least one target expectation corresponding to the at least one expectation identifier, wherein the at least one target expectation comprises a message and a timer, and transmit to a device, the message of the at least one expectation; and in an event of generation of the unsuccessful expectation identifier matching result, transmit to the device, an error message, and store at the memory, at least the at least one expectation identifier in the trigger, the at least one target expectation and the error message.

27. The system as claimed in claim 26, wherein the asynchronous protocol server is further configured to:

record a time of transmission of the message;

start, a timer wherein the timer is configured to expire at the end of a timeout duration;

identify, one of:

a first event comprising a receipt of an acknowledgement message prior to an expiry of the timer, and a second event comprising an expiry of the timer and an acknowledgement message is not received prior to an expiry of the timer, determine a status of delivery of the message based at least on the time of transmission of the message and the timeout duration; and store at the memory, the determined status of delivery of the message.

28. The system as claimed in claim 16, wherein in an event the set of expectations comprises a sequence comprising a plurality of transient expectations in an order, the at least one processor is configured to compare the set of expectations with the updated set of scenarios by:

compare, in the order, each transient expectation in the sequence with each scenario from the updated set of scenarios; and validate the sequence based on the comparison to generate a sequence validation result, wherein the sequence validation result is one of a successful result and an unsuccessful result, wherein the sequence validation result is the successful result in an event each expectation in the sequence matches with a scenario from the updated set of scenarios, and the sequence validation result is the unsuccessful result in an event at least one expectation in the sequence does not match with a scenario from the updated set of scenarios.

29. The system as claimed in claim 16, wherein the at least one processor is further configured to:

receive at least one verification request comprising a matching details;

compare the received at least one verification request with a set of interactions stored in the memory to generate one of a successful result and an unsuccessful result;

In an event of generation of the successful result, the at least one processor is configured to:

retrieve from the memory one or more interactions associated with the matching details in the received verification request; and provide the retrieved one or more interactions to the device; and In an event of generation of the unsuccessful result, the at least one processor configured to:

generate, an error response; and provide the error response to the device.

30. The system as claimed in claim 16, wherein the at least one processor is further configured to generate a coverage report based at least on the set of specifications and a set of interactions stored in the memory.

31. A non-transitory computer readable medium comprising instructions for validating a set of expectations based on a set of specifications, which when executed cause a processor to:

receive, the set of specifications;

generate, a set of scenarios based on the received set of specifications;

dynamically receive, the set of expectations;

compare, the set of expectations with the set of scenarios;

identify, a set of valid expectations and a set of invalid expectations from the set of expectations based on the comparison between the set of expectations and the set of scenarios;

store, the set of valid expectations and the set of scenarios;

receive, a set of requests;

service, the set of requests based at least on the set of valid expectations and the set of scenarios;

while servicing the set of requests, the instructions simultaneously causes the processor to:

continuously and dynamically monitor, the set of specifications to identify one or more changes in at least one specification from the set of specifications, dynamically update, the set of scenarios to generate an updated set of scenarios based on the identified changes in the at least one specification, compare, the set of expectations with the updated set of scenarios, dynamically identify, an updated set of valid expectations based on the comparison between the set of expectations and the updated set of scenarios, and store, the updated set of valid expectations and the updated set of scenarios;

receive, a set of new requests; and service, the set of new requests based at least on the updated set of valid expectations and the updated set of scenarios.

* * * * *